(12) United States Patent
Goroshevsky et al.

(10) Patent No.: US 7,990,948 B2
(45) Date of Patent: Aug. 2, 2011

(54) SERVERLESS AND SWITCHLESS INTERNET PROTOCOL TELEPHONY SYSTEM AND METHOD

(75) Inventors: Dmitry Goroshevsky, Valbonne (FR); Julius Goryavsky, Saint Petersburg (RU); Andrei Stoudnev, Valbonne (FR)

(73) Assignee: Quintence Properties KG, LLC, Dover, DE (US)

( * ) Notice: Subject to any disclaimer, the term of this patent is extended or adjusted under 35 U.S.C. 154(b) by 2287 days.

(21) Appl. No.: 10/641,821

(22) Filed: Aug. 15, 2003

(65) Prior Publication Data
US 2005/0036482 A1 Feb. 17, 2005

(51) Int. Cl.
*H04L 12/66* (2006.01)
*H04L 12/56* (2006.01)
(52) U.S. Cl. .................. 370/352; 370/353; 370/400
(58) Field of Classification Search .................. 370/352, 370/353, 400
See application file for complete search history.

(56) References Cited

U.S. PATENT DOCUMENTS

| | | | |
|---|---|---|---|
| 5,623,490 A | 4/1997 | Richter et al. | |
| 6,175,562 B1* | 1/2001 | Cave | 370/352 |
| 6,665,392 B1 | 12/2003 | Wellner et al. | |
| 6,904,142 B1* | 6/2005 | Tanaka | 379/221.04 |
| 6,956,827 B2 | 10/2005 | Goryavsky | |
| 7,146,371 B2 | 12/2006 | Hofstee et al. | |
| 7,471,687 B2 | 12/2008 | Goryavsky | |
| 2002/0188657 A1 | 12/2002 | Traversal et al. | |
| 2003/0061376 A1 | 3/2003 | Li et al. | |
| 2003/0072330 A1 | 4/2003 | Yang et al. | |
| 2003/0088673 A1 | 5/2003 | White et al. | |
| 2003/0123635 A1* | 7/2003 | Lee | 379/220.01 |
| 2003/0202648 A1* | 10/2003 | Masuhiro et al. | 379/242 |
| 2004/0054807 A1 | 3/2004 | Harvey et al. | |
| 2004/0090970 A1* | 5/2004 | Sanchez et al. | 370/397 |
| 2004/0156485 A1 | 8/2004 | Poustchi et al. | |
| 2004/0249970 A1 | 12/2004 | Castro et al. | |
| 2005/0036482 A1 | 2/2005 | Goroshevsky et al. | |

(Continued)

FOREIGN PATENT DOCUMENTS

CN 1412983 A 3/2001

(Continued)

OTHER PUBLICATIONS

ISR mailed Apr. 20, 2006 for PCT Application No.PCT/US04/26119, 4 pages.

(Continued)

*Primary Examiner* — Rasha S Al Aubaidi
(74) *Attorney, Agent, or Firm* — Turocy & Watson, LLP

(57) ABSTRACT

A serverless telephony system (STS) establishes and maintains a voice, data and video exchange between telephony devices using Internet Protocol (IP). The STS in a preferred embodiment comprises software running on a telephony device with a standard packet network connection over a local area network (LAN) or a wide area network (WAN), or a combination, which may include the Internet network. The new system enables one telephony device to establish a connection with another telephony device without intervention by any third device such as a switch or a server. In one embodiment an IP-PBX (Internet Protocol-Private Branch Exchange) application is provided having no server presented in the network for establishing a call between any two IP phones on a Local Area Network (LAN), providing substantially all services typically expected from a standard PBX, and yet functions in compliance with one or more of a H.323, a MGCP, a SIP protocol or any one of other standard protocols.

70 Claims, 16 Drawing Sheets

U.S. PATENT DOCUMENTS

| | | | |
|---|---|---|---|
| 2005/0091443 | A1 | 4/2005 | Hershkovich et al. |
| 2005/0114862 | A1 | 5/2005 | Bisdikian et al. |
| 2005/0135381 | A1 | 6/2005 | Dubnicki et al. |
| 2005/0203901 | A1 | 9/2005 | Waldvogel et al. |

FOREIGN PATENT DOCUMENTS

| | | |
|---|---|---|
| JP | 06085845 A | 3/1994 |
| JP | 10290264 A | 10/1998 |
| JP | 2001086166 A | 4/2003 |
| JP | 2003204387 A | 7/2003 |

OTHER PUBLICATIONS

CNOA dated Dec. 12, 2008 for Chinese Patent Application No.2004800265721 and translation, 8 pages.

JPOA dated Oct. 27, 2008 for Japanese Patent Application No.2006-523359, mailed Nov. 4, 2008, with translation and Japanese Patent Abstracts, 13 pages.

ISR mailed Sep. 8, 2005 for PCT Application No. PCT/US05/004764, 6 pages.

CN OA dated Dec. 21, 2007 for Chinese Patent Application No. 2004800265721 and translation, 17 pages.

CN OA dated Apr. 29, 2010 for Chinese Application No. 200480026572.1, 5 pages.

JP OA mailed May 28, 2010 for Japanese Patent Application No. 2006-523359, translation 3 pages.

Chinese OA dated Dec. 15, 2010 for Chinese Application No. 200480026572.1, 4 pages.

\* cited by examiner

Ring limit:6

SERVERLESS AND SWITCHLESS INTERNET PROTOCOL TELEPHONY SYSTEM AND METHOD

FIELD OF THE INVENTION

The present invention relates to IP telephony systems generally and, more particularly to an Internet Protocol (IP) Private Branch Exchange (PBX) system implemented without servers or switches.

BACKGROUND OF THE INVENTION

A PBX is an automatic telephone switching system that enables users within an organization, often termed in the art a customer premise, to place calls to one another without having to access a public switched telephone network (PSTN). Users of a PBX can also place calls to outside numbers via the PBX. PBXs are typically located on the premises of a customer and provide a great deal of control and flexibility in the customer's communications. PBXs are well known in the art, and are described, for example, in "PBX Systems for IP Telephony", by Al Sulkin, (MacGraw-Hill, NY) © 2002.

There are presently two general classes of switching system configurations available to serve the communication needs of business customers. The first is the PBX located on the customers' premises, and the second is the central office based system, e.g., CENTREX system, where lines are extended from the central office to individual customer stations but advanced features are provided by means of call processing software executed in the central office system. PBXs are considered advantageous by customers who desire a great deal of control and flexibility in their communications. Central office systems are typically preferred by customers who wish to avoid the responsibility and cost associated with operating and maintaining an on-premises switch.

Lately both the PBX and CENTREX approaches have been adapted for use in IP (Internet Protocol) based networks as well as of Time Division Multiplexing (TDM) networks. Such systems are called in general IP Telephony systems or IP-PBXs, and are described for example in U.S. Pat. No. 5,875,234, which describes a computer integrated telephony (CIT) system that integrates a PBX with a Local Area Network (LAN), and also in U.S. Pat. No. 6,424,700, which describes network-based telephone systems, and in particular systems and methods of integrating a private branch exchange (PBX) into a shared resource network.

Centralized design is used in most state of the art Telephony and IP-Telephony systems and networks. In centralized design a server (e.g. switch, access node, cabinet and so on) is executing most of system features and services. Such a centralized approach, however, is not taking full advantage of newly-available features of IP networks with vendors repeating their TDM design and applying it to IP Telephony (IPT) systems. This situation is creating technical problems and delaying market adaptation of IP Telephony in general.

According to BCR eWeekly, Issue 58—"Thinking About Next-Gen IPT", part of the reason that it's tough to find either compelling economics or applications for IP Telephony is because vendors of such systems have tried to port the circuit-switched model into the IP world. So, not surprisingly, what IP Telephony typically delivers looks and behaves very much like what TDM delivered. Vendors also have ported the TDM cost model into IP telephony. For example, phones often account for somewhere around 30 percent of the cost of a new system. Cisco and other IP-telephony pioneers didn't try to change the cost model when they opened up this new territory, and not surprisingly, the traditional vendors haven't been eager to change it either.

The TDM design and systems approach was created out of limitations and characteristics of then-current technologies, systems and networks. For example, it was not possible to surrender system control to end-user devices and at the same time to provide efficient interconnectivity for all system features. Limitations in processing power as well as in software sophistication and lack of universal protocol for interconnect dictated the design of all Telephony Systems for the last 20 years. But the introduction of IP Telephony as well as general advancement in processor technology have made it possible for the present inventors to move on and develop a radically new and innovative design, which operates without a central system or server for controlling the call process or any additional telephony feature.

The present inventors have determined that a serverless design for IP Telephony would be very desirable, and would be ideal for substantially all basic aspects of telephony, such as call establishment delay, and for creation and adaptation of new services. Such an innovation also makes it much cheaper to communicate, and eliminates switches or servers dedicated to call control, and the cost of such equipment, making the network purely a transport for IP services, thus much easier to manage, maintain and support. Further, a purely serverless IP telephony system provides enhanced scalability, flexibility, redundancy, reliability, efficiency, cost-effectiveness and more.

Following are problems involved that have been addressed in creating such a system:

Serverless Addressing Resolution

Typically a central addressing server is used in IP Telephony systems in order to identify the called party's IP address. Each IP Telephony standard has its own name for such a server: Gatekeeper in H.323, Proxy in SIP, Call Agent in MGCP or Soft Switch in Packet Cable. Each vendor may call this server or other server that performs such functionality by a different name, but the functionality is still common. Since there is no central addressing server in the innovative system described in various embodiments in this disclosure, there is a problem for a calling party to identify a network address of the called party. The problems are greater when no permanent IP address exists on the network and such protocols as DHCP are in use.

Configuration

There is a problem with configuration of end-user devices in a serverless system since no permanent configuration server exists. These particular problems involve configuration update for any device that is out of order or unreachable at a particular time of administration update, or efficient traffic management when the system involves big numbers of such end-user devices.

Additional Services

There are large numbers of services expected from any telephony system, particularly from an IP-PBX system. For example, such features as REDIRECT, call transfer, call park, forwarding, follow me, hoteling, all of which are common terms in the art, and so on that will be described in detail elsewhere in this specification. Such services and features are significantly different in implementation within a serverless system as conceived by the present inventors, since no central call control and management server is presented for resolving possible conflicts, unavailability of specific end-user devices, or unavailability of part of the network.

Even more complicated for implementation is the group of advanced PBX features, such as Discrete Call Observing, Invite, Executive Busy Override and so on, which may involve a distributed data base for proper functioning. Roaming and related features (hoteling, follow me) also are significantly difficult for implementation in a serverless system, since there is no centralized profile data base which is not related to actual end-user device location and functioning.

Data storage-related features such as Call Record, Voice Mail and so on require storage servers (such as LDAP for example) in conventional telephony systems. In the present invention such features are handled by a distributed storage system, which is by itself innovative and a technological challenge of high degree.

Management

When no server is involved there is a particular problem of monitoring calls and monitoring quality and resources on the network without overloading the network with system messages.

Fault Tolerance

While redundancy and fault tolerance are addressed in server architecture by using well known methods, in a serverless system there is a problem of supporting the seamless work of all the end-user devices so they are not affected by sudden "death" of others.

Security

In state of the art conventional telephony systems security is handled by a special server which can be physically protected, and no connection involves another device or server which may be de-facto not protected. In a serverless system the case is quite the opposite. There is no central server and the connections possibly involve third party's end-user devices which make such a system potentially vulnerable for such security attacks as "man-in-the-middle", and creates a problem with caller authentication, with non-repudiation of call, and so on.

So it is readily seen that there are a significant number of problems that need to be addressed in order to create a serverless IP system. In general, various conventional systems address at most a subset of the problems discussed above. There is clearly a need in the art for a system and corresponding method for solving one or more of the aforesaid problems in a comprehensive manner with a serverless system.

SUMMARY OF THE INVENTION

The problems described in the Background section are solved and significant technical advantage is achieved in accordance with the principles of the invention in an exemplary system and method for processing calls and providing additional features to highly interactive and intelligent user stations that perform communication and process call control packets to coordinate initiation, disconnection and other processing of calls without involving any system control, and for the communication of packetized information of various types, e.g., voice, data or image information, during the calls. Customers in embodiments of the invention have full control over call features because such features are fully implemented in individual ones of the intelligent user stations.

The system of the invention is referred to herein as a "Serverless IP-PBX" because a high degree of customer control and flexibility in the implementation of advanced telephony features has in the past been primarily associated with PBX or IP-PBX systems. Thus, a group of intelligent stations (end-user devices) that process calls in the manner of the present invention operate, in effect, as though they were served by an on-premises switch or server, even though they may, in fact, be only served by an IP network infrastructure alone. Although the packet switching arrangement in exemplary embodiments described herein is a single packet switching network (LAN), the invention is also applicable to arrangements comprising an interconnected network of such systems or a global network of such intelligent devices.

In order to achieve the functionality of a server-based system in a serverless network of end-user devices, virtual rings technology is used in some embodiments of the present invention. The creation and use of logical virtual rings in this invention has some similarity with ARCNet Token Bus and IBM Token Ring technology. In IBM Token Ring and other conventional "token pass" technologies the rings are created on the channel layer in order to achieve a regularity and order, and by this a quality of service in packet computers network is attained. In some embodiments of the present invention virtual rings are used on the application layer which uses TCP or UDP over IP (Ethernet) protocol, and no need for any physical or channel level rings exists. In some embodiments of the present invention tokens in virtual rings are used for reliable packet delivery, flow-control, redundancy, and for support of supplementary services.

In a preferred embodiment of the present invention, in order to achieve a reliable message delivery (RMD), the end-user devices located in the LAN are combined into a special structure the inventors term two-sided multi-connected virtual rings (RMD-TSM-CVR). In modern LANs a common practice is to divide an IP network into smaller sub-networks in order to minimize the number of IP packets received by all end-user devices on the channel network layer. In some embodiments of the present invention any and all end-user devices are combined into one or more of such RMD rings if more than one of such devices is present in the sub-network. Usually the size of the RMD ring will be equal to the size of the sub-network, but if the sub-network is more than a class C sub-network, then the ring may be split into two or more smaller, interconnected TSM-CVRs using one of novel self-determination and self-management mechanisms as described in further detail below.

In a preferred embodiment of the present invention, in order to achieve redundancy, and also to provide supplementary services and PBX-like functionality, logical TSM-CVRs (L-TSM-CVR) are created. The end-user devices connected by such logical TSM-CVRs may be members of different sub-networks, and the size of these logical rings is not limited by the size of any sub-network on the LAN.

The TSM-CVRs from either RMD or Logical types support different self-determination, self-management and self-control mechanisms as described in further detail below. In contrast to traditional "token pass" technologies, there is no need for any special device on the network (hub, server etc.) in order for the rings to function properly in the innovative serverless system.

In some embodiments of the present invention the end-user devices may switch on and off. This can lead to dynamic changes in ring topology. It is important to understand that if one or more end-user devices are switched off, that action leads to break up of the associated ring. In embodiments of the invention, using multi-connection, the end user devices in the ring self-detect such breaks and correct them. If the end-user devices will switch "off" and "on" frequently, such corrections and changes in TSM-CVRs' topology may lead to IP Network overflow. In order to avoid such overflow, certain delay is required before the ring topology is about to be corrected. The delay is set up by a system administrator.

In some embodiments of the present invention a multicast mechanism may be used for massive data updates and address resolution under certain conditions. In preferred embodiments of the present invention the LAN or IP Network may support multicast, and routers that connect one or more IP networks or sub-networks may support IGMP and Multicast forwarding protocols described in details in IETF documents known in the art. Also in some preferred embodiments of this invention a main multicast group may be used for recognition of neighbors at the end-user device start up. Multicast is used for such as set-up procedures, massive data updates and address resolution if other address resolution mechanisms have failed.

In contrast to conventional server-based PBX or IP-PBX systems, in embodiments of the present invention different data storage and data access mechanisms are used. In embodiments of the present invention all data is stored on the end-user devices and no server or storage device is needed.

Further in some preferred embodiments of this invention every end-user device has power-independent flash memory. The end-user device is storing user data and general and service network data as well as certain parts of a global system data base. The end user device is supporting access and replication mechanism of the data base, in order to achieve accessibility and fault-tolerance.

Since in some embodiments of the invention all data is distributed to the end-user devices, it is necessary to relocate this data across the network if one or more of the devices are not functioning properly, in order to achieve system redundancy and fault-tolerance. In some preferred embodiments of this invention such a data relocation system is described. Numerous variations of such relocation mechanisms may be used in various embodiments, which may not however detract from one of the advantages of this invention, e.g. using a data relocation method to achieve an independence of data access from any malfunction of a particular end-user device in a serverless telephony network.

In a preferred embodiment of the present invention the general rule is that the most needed (most frequently used) data is stored in the most places. According to that rule, the network information is duplicated in each end-user device and general network information is stored in more end-user devices than personal data. The superfluity factor for storage is set up by a system administrator. In some preferred embodiments personal information is duplicated four times and general network data is duplicated not less than four times in each sub-network. Such information as an administrator public key is stored in each end-user device and is stored during the first configuration.

Therefore, in accordance with the context provided above, it is an object of the invention to provide an Internet Protocol (IP) telephony system, comprising a network; two or more IP telephone units, each interfaced to the network; and an instance of an IP-Telephony software executing on each of the telephone units; the system characterized in that the telephone units, through executing the software instances, automatically cooperate to form organizational groups in the network, enabling individual ones of the units to place IP calls to and receive IP calls from individual other ones of the telephone units, in absence of any switches or servers in the network.

It is a further object to provide such a system wherein individual ones of the software instances also provide for communication of text and image data as well as voice data between individual ones of the telephone units. Further in an embodiment of the invention the telephone units interfaced to the network form and deform virtual token rings as the organizational groups. In some cases the virtual rings formed are two-sided, multi-connected virtual rings.

In some embodiments of the system the cooperation of the telephone units provides control functions whereby, upon activation, an individual telephone unit connected to the network is registered as a member of a virtual ring in the network, and upon deactivation, membership in the virtual ring is withdrawn. In these and other embodiments individual ones of the telephone units may be endowed with mass storage, and the cooperation of the telephone units treats the mass storage at individual stations as shared memory. The mass storage shared memory in many embodiments provides for voice mail services for users at individual ones of the telephone stations. Further in some embodiments the shared memory enables inter-unit transfer and storage of data files other than voice files.

In various embodiments the network may be one of a local area network (LAN), a wide area network (WAN), the Internet network, or a combination of networks. In further embodiments multicast technology is incorporated for at least data and software updating of nodes in virtual rings. In some power-independent flash memory is used for all or part of the mass storage, and also in some cases redundancy storage and a data relocation schemes are implemented on multiple telephone units to provide fault tolerance. In some cases stored data is prioritized, and the highest priority data is stored in more places than lower priority data. Also in some cases one or more telephone units are enabled as administrator stations, having administration functions to configure the system.

In another aspect of the invention an IP-telephony unit is provided comprising a port for connecting to a network and an instance of an IP telephony software. The unit is characterized in that the telephony unit, by virtue of executing the software is enabled to automatically cooperate to form organizational groups in the network in packet communication with other IP telephony units, enabling individual ones of the units to place IP calls to and receive IP calls from individual other ones of the telephone units, in absence of any switches or servers in the network In some embodiments of the IP-telephony unit the software instance provides for communication of text and image data as well as voice data on the network. Also in some embodiments the telephone unit interfaced to the network is enabled to form and deform virtual token rings as the organizational groups. In still other embodiments the virtual rings formed are two-sided, multi-connected virtual rings. In yet other embodiments the telephone unit provides control functions whereby, upon activation, the telephone unit connected to the network is registered as a member of a virtual ring in the network, and upon deactivation, membership in the virtual ring is withdrawn.

In some cases the telephone unit is endowed with mass storage, and in cooperation on the network the mass storage is treated as shared memory. Also in some cases the shared memory provides for voice mail services for a user of the telephone unit. Further, in some cases the shared memory enables inter-unit transfer and storage of data files other than voice files. The network may be one of a local area network (LAN), a wide area network (WAN), the Internet network, or a combination of networks.

In some embodiments multicast technology is incorporated for at least data and software updating of nodes in virtual rings. Also, power-independent flash memory may be used for all or part of the mass storage. A redundancy storage and a data relocation scheme may be implemented to provide fault tolerance. In some cases stored data is prioritized, and the highest priority data is sent out to be stored in more places than lower priority data. Also in some cases the telephone unit is enabled as an administrator station, having administration functions to configure a system of telephone units cooperating on a network.

In yet another aspect of the invention a method for Internet Protocol (IP) Telephony is provided, comprising the steps of (a) providing two or more IP telephone units interfaced to a network; and (b) executing an instance of an IP-Telephony software on each of the telephone units, such that the telephone units automatically cooperate to form organizational groups in the network, enabling individual ones of the units to place IP calls to and receive IP calls from individual other ones of the telephone units, in absence of any switches or servers in the network In some embodiments of the method individual ones of the software instances also provide for communication of text and image data as well as voice data between individual ones of the telephone units. In these and some other embodiments the telephone units interfaced to the network form and deform virtual token rings as the organizational groups. The virtual rings formed may be two-sided, multi-connected virtual rings. In still further embodiments the cooperation of the telephone units provides control functions whereby, upon activation, an individual telephone unit connected to the network is registered as a member of a virtual ring in the network, and upon deactivation, membership in the virtual ring is withdrawn.

In some embodiments of the method individual ones of the telephone units are endowed with mass storage, and the cooperation of the telephone units treats the mass storage at individual stations as shared memory. In some cases the shared memory provides for voice mail services for users at individual ones of the telephone stations. The shared memory may also enable inter-unit transfer and storage of data files other than voice files. In preferred embodiments the network is one of a local area network (LAN), a wide area network (WAN), the Internet network, or a combination of networks.

In still further embodiments of the multicast technology is incorporated for at least data and software updating of nodes in virtual rings. In yet further embodiments power-independent flash memory is used for all or part of the mass storage. Redundancy storage and a data relocation scheme may be implemented on multiple telephone units to provide fault tolerance. In some embodiments stored data is prioritized, and the highest priority data is stored in more places than lower priority data. Also in some embodiments one or more telephone units may be enabled as administrator stations, having administration functions to configure the system.

In embodiments of the invention described in enabling detail below, for the first time an IP-telephony system is provided on a network, providing robust functionality and operates seamlessly without switches or servers in the network.

BRIEF DESCRIPTION OF THE DRAWING FIGURES

DESCRIPTION OF THE PREFERRED EMBODIMENTS OF THE INVENTION

Figure 1:
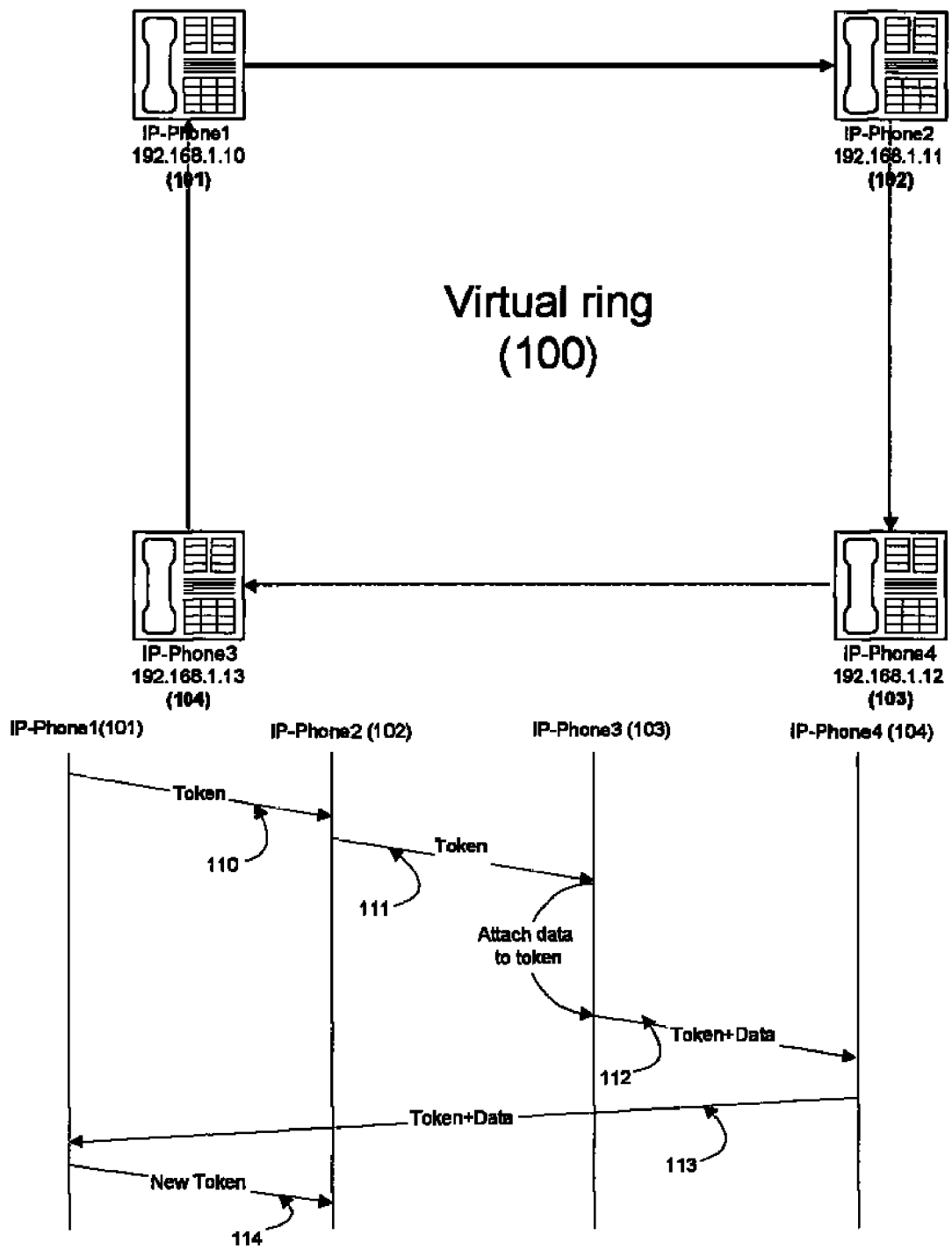
FIG. 1 is a network diagram illustrating a virtual ring structure and a corresponding time diagram in an embodiment of the present invention.

FIG. 1 is a network diagram illustrating a virtual ring structure and a corresponding time diagram in a preferred embodiment of the present invention. In preferred embodiments of the invention virtual rings are used to provide logical partitioning of nodes in the sub-networks, reliable delivery of messages and support of heart-beat protocol, more fully described below.

A virtual ring is a sequenced number of nodes, each of which recognizes at least two of its members (typically the previous one and next one on the ring). A size of the ring is always limited by a size of its sub-network, e.g. all the nodes of the ring must be members of the same IP sub-network. However, the number of rings inside its sub-network is not limited.

Ring's cohesion is supported by propagating a special message over the ring, which is called a token, similar to IBM Token Ring protocol. The token is generated by one (elected) node (such as 101) in the ring and sent across the ring from one node to another, for example from 101 to 102 to 103 to 104 and then to 101 again, and so on, to all of the ring members. Node 103, for example, can attach data to the token before sending it further, and another node, such as node 104, which receives a token, can read the data attached to it and so on.

According to the data attached to the token the ring members can perform necessary operations. Also a node which receives the token (and only such a node) can perform a multicast message distribution across the network. This way an order of message delivery and reception is achieved.

Another token use is in support of a heart-beat protocol. Since a token is delivered from one node to another sequentially in the ring, the reception of a token by a node which generated it indicates that all ring nodes are present and operating, e.g. the ring is coherent.

In a preferred embodiment each of the rings in the network must correspond to one multicast-group. In other words, a message sent to a specific multicast group must be delivered to all ring members. Thus, in this preferred embodiment the number of multicast groups is equal to the number of virtual rings in the network. Reliable multicast message delivery may also be based on virtual rings. In embodiments of the current invention any reliable multicast delivery protocol which supports total message ordering, based on virtual rings topology, can be used. In a preferred embodiment Totem protocol is used.

In embodiments of the present invention the multicast mechanism may be used for all system data updates. When the network is functioning properly all sent packets are received at each destination. But typically some packets are lost in an IP network. In order to ensure reliable delivery of all packets to all end-user devices, periodical questioning of all ring members is required. To accomplish this in embodiments of the invention a ring member sends a token which consists of the number of the most recent UPDATE received by that node. Data sent with such a token includes a virtual time field (contains sequence number of last sent message). When a node which receives such a token sends a multicast message, it increase the value of the time field by one, then sends a token with the increased time value to another Node. A node also includes the value of the virtual time field in every multicast-message as an update sequence number. Using such a number all other nodes can search all multicast messages they receive and detect a possible message lost. [Totem Protocol cross-reference number]

If the sequence number on the end-user device is smaller than one received then at least one packet was lost during the session. To receive the lost packet or packets the end-user device then asks the previous device in the ring order to repeat the most recent update. If the number on the end-user device is bigger than one received then, possibly, the update was received after the market turnover. The end-user device then writes the number of the new update into the marker and sends it further over the ring. This provides the first end-user device in the ring with information about the turnover speed of updates. The delay of marker turnover should be comparable with the delay of update packets.

In the time diagram of FIG. 1 IP-Phone1 101 generates a new token and delivers it to IP-Phone2 102 (leg 110). IP-Phone2 102 receives the token and sends it to IP-Phone3 103 as is (leg 111). IP-Phone3 103 receives the token, adds certain data it wants to transmit to IP Phone1 101 to the end of the token and sends the token to IP-Phone4 104 (leg 112). IP-Phone4 104 receives the token with attached data and sends it on to IP-Phone1 101 (leg 113). IP-Phone1 101 receives the token with attached data, and thus receives necessary data, generates a new token, sends it to IP-Phone2 102 (leg 114), and so on.

Figure 2:
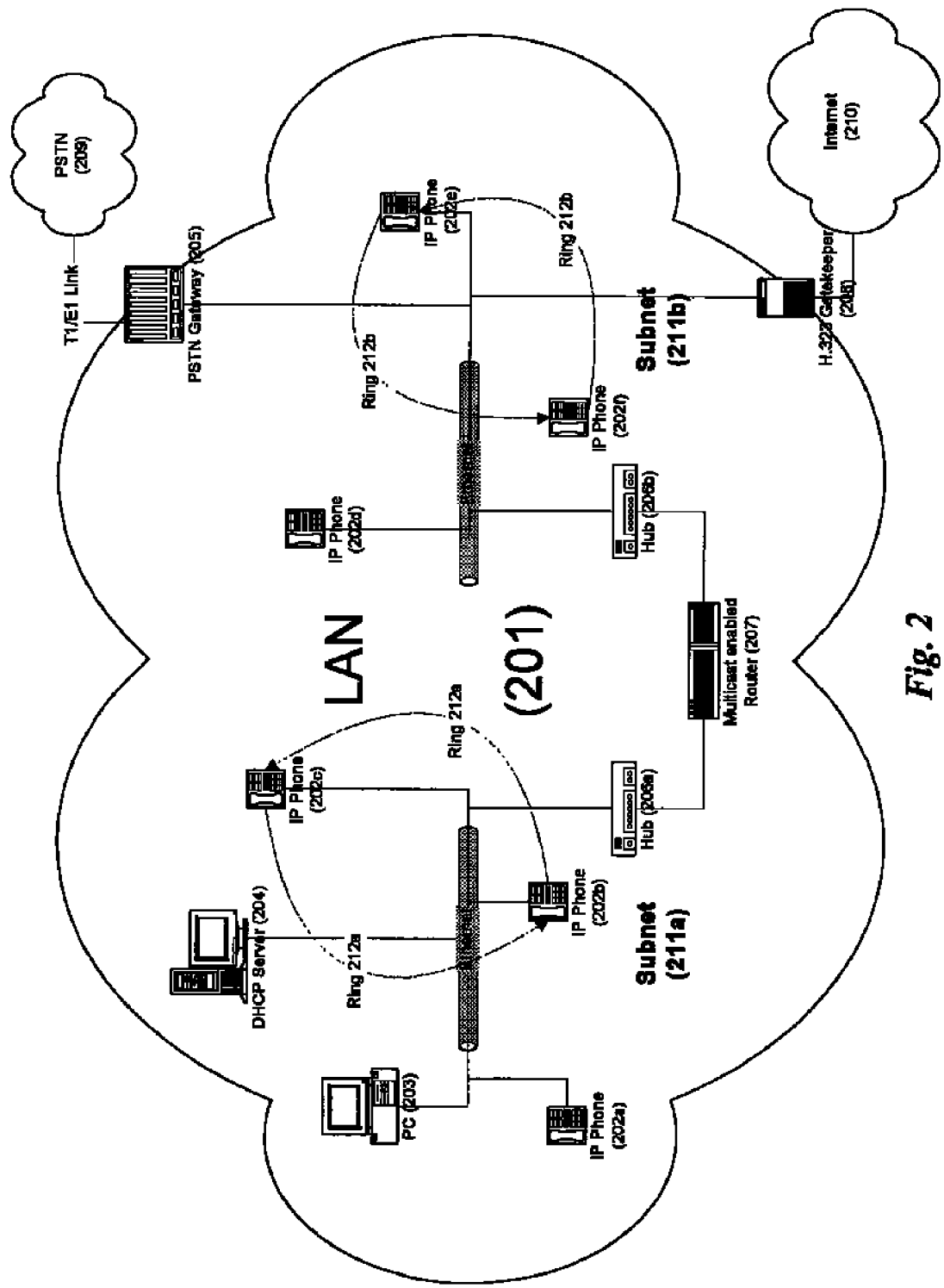
FIG. 2 is network diagram illustrating a conventional Local Area Network (LAN) with IP-Phones, Computers, Servers, Routers, Hubs etc.

FIG. 2 is a network diagram describing a Local Area Network 201. The network architecture shown comprises a few IP-Phones 202a, 202b, 202c . . . 202f, or nodes, gateway 205 in PSTN 209, and H.323 gatekeeper 208, that is the gateway to Internet 210. Every node in the network is connected to hub/switch 206a/206b. Except for IP-Phones there are DHCP-server 204 and one or more Personal Computer (PC) devices 203.

Routers 207 need to be configured in a way that all packets will reach all sub networks, such as 211a, 211b, where the IP Phone devices such as 202a, 202b, 202c are installed. The address of such main group can be 239.192.0.1 by default, for example, but a system administrator can change that address using conventional technology. It is supposed, that the administrator thus has adjusted routers in the organization, that local multicast traffic (i.e. allocated IETF in a range: 239.192.0.0/14) does not leave the organization's network. Also it is considered that the multicast traffic can not pass in an internal network from the outside (should be filtered by the router or a firewall).

IP Phones 202a, 202b, 202c, and so on, in the present embodiment may use either static or dynamic IP (DHCP) network configuration methods. After receiving its IP address on start up (as described in FIG. 7 below), a user device may search for the neighbors in its own sub-network 211a, and if not successful, then in other sub-networks, such as 211b for example. IP Phone 202a will use group 224.0.0.1 of all its sub-network addresses for the search. If the search proves unsuccessful, then it will try to connect to the main group (e.g. 239.192.0.1. in the present embodiment). If even then it does not receive an answer it will assume itself to be the first device in the network, or, alternatively that the IP Network is not supporting IP multicast.

Presumably IP Phone 202a receives an answer from the nodes with the largest IP address in every ring, including 202b which is a node with a largest IP address in its ring 212a. Node 202a chooses any one of the rings and asks for permission to participate (membership) from node 202b. If an answer is not received after a certain time, the node repeats the permission request to a node with a higher number. Accordingly, it will be answered by nodes closer to the ring's starting point. The procedure repeats until the answer is received.

Figure 3:
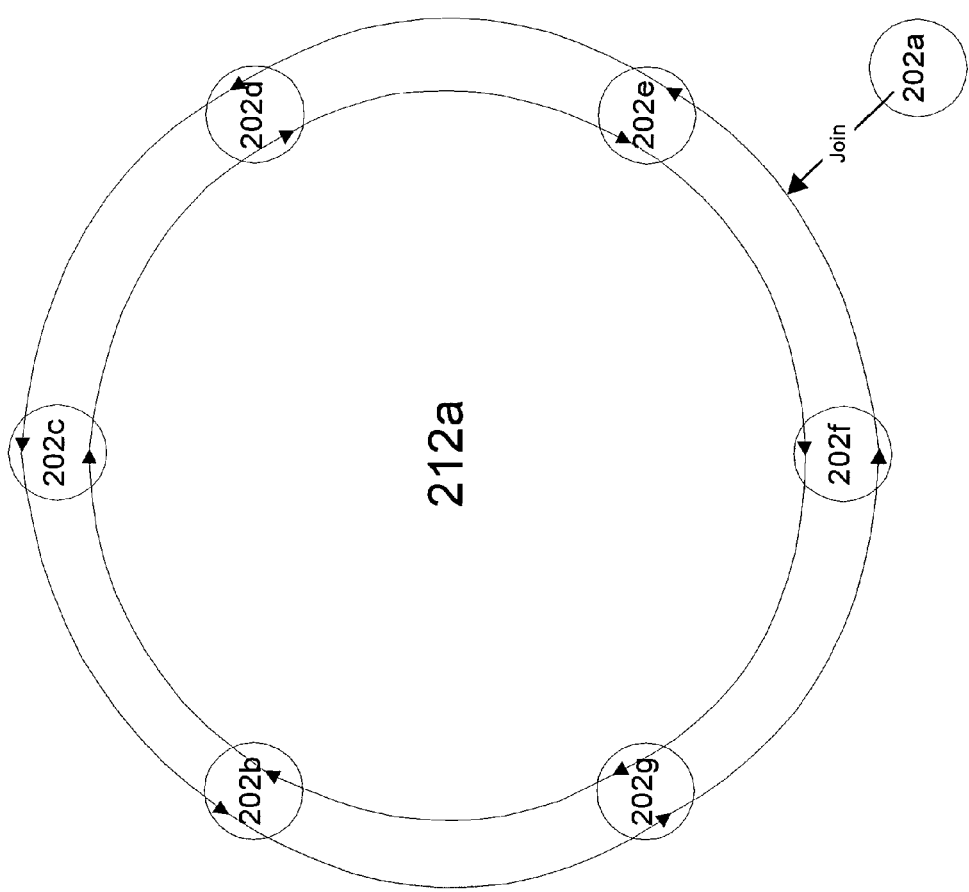
FIG. 3 illustrates a first phase in a process of joining rings by a node in an embodiment of the invention.
Figure 4:
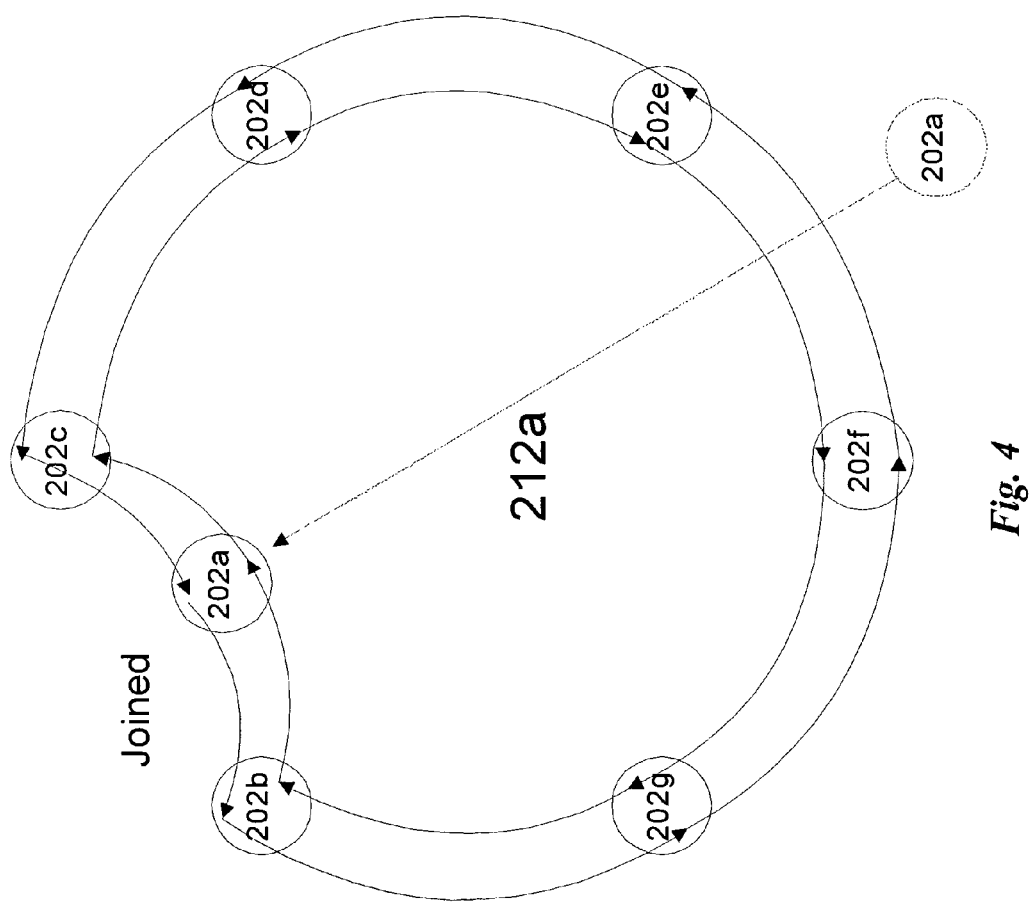
FIG. 4 illustrates a second phase in a process of joining the ring by a node in an embodiment of the invention.

FIG. 3 and FIG. 4 illustrate phases 1 and 2 in a process of a node 202a joining ring 212a by a node 202b of FIG. 3, which is assumed here to be an IP telephone station enabled according to an embodiment of the present invention. Node 202b accepts the new member and initiates the procedure of including (subscribing) node 202a into the ring by sending a token to present ring members. Node 202b attaches to the token a request to insert new IP Phone 202a with IP address of the IP Phone (202a). All of the members of the ring receive the request and add into the token their IP address if the IP address value is closer to the IP address of IP Phone 202a then one in the token. This is done for both lesser and larger values (for example 10 is closer to 11 then 5, and 12 is closer to 11 then 20). After the token traverses the entire ring it comprises two IP addresses, those of IP Phones 202b and 202c, for example, which are the closest to the IP address of IP Phone 202a from both sides. In response to the token from 202a on FIG. 3 with request for membership, Node (202b) is thus announcing to 202a two of its neighbours, 202b and 202c of FIG. 3, between which it needs to be placed in the ring topology. New member 202a sends to its new neighbours 202b and 202c a request (token), and asks them to update their pointers in order for it to join the ring.

After the joining procedure is completed, Node 202a synchronizes its own local database with the current database and asks Node 202b to provide information about the current version. Node 202b sends the current version to Node 202a. After joining the ring node 202a is considered fully integrated into the Serverless Telephony system in the present embodiment.

Figure 5:
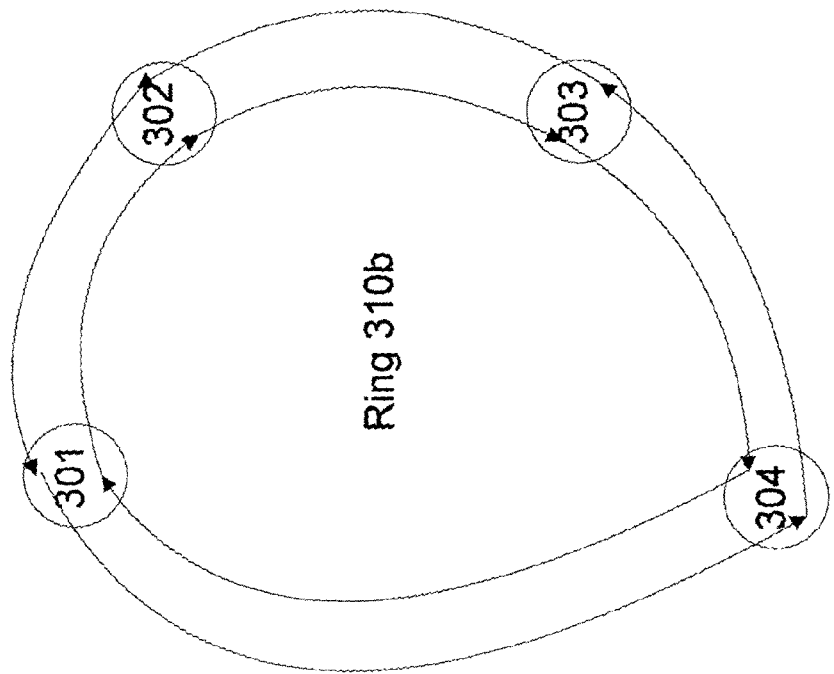
FIG. 5 illustrates a process of a ring's splitting in an embodiment of the present invention.
Figure 5:
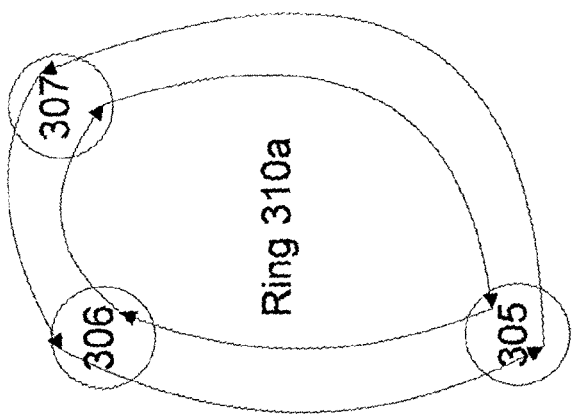

FIG. 5 Illustrates a process of a ring's splitting. If a large number of end-user devices are present in the sub network, the ring's length may become too big, and the time of token turnover will become too long as a result. In order to avoid this problem, when the ring length reaches a specific limit set up by system administrator (such number is set to 6 in a preferred embodiment) it will divide itself by two and a new ring will be established.

Referring now to FIG. 5 again, assume there is initially one ring with 6 nodes and the Ring Limit is set to 6 by the administrator. Now a new Node (307) is joining the ring. As a result the Ring Limit parameter is exceeded. Thus, in order to preserve the parameter correctness the ring must be split into two rings 310a and 310b. In order to achieve this, the ring is divided approximately by 2(+/−1) and nodes that are bordering the split, such as nodes 304, 305, 301 and 307 modify their pointers. In FIG. 5, node 304 modified its pointer from 305 to 301, and thus creates a new, smaller ring 310b. Node 307 modifies its pointers from 301 to 305 and thus creates a new, smaller ring 310a.

Figure 6:
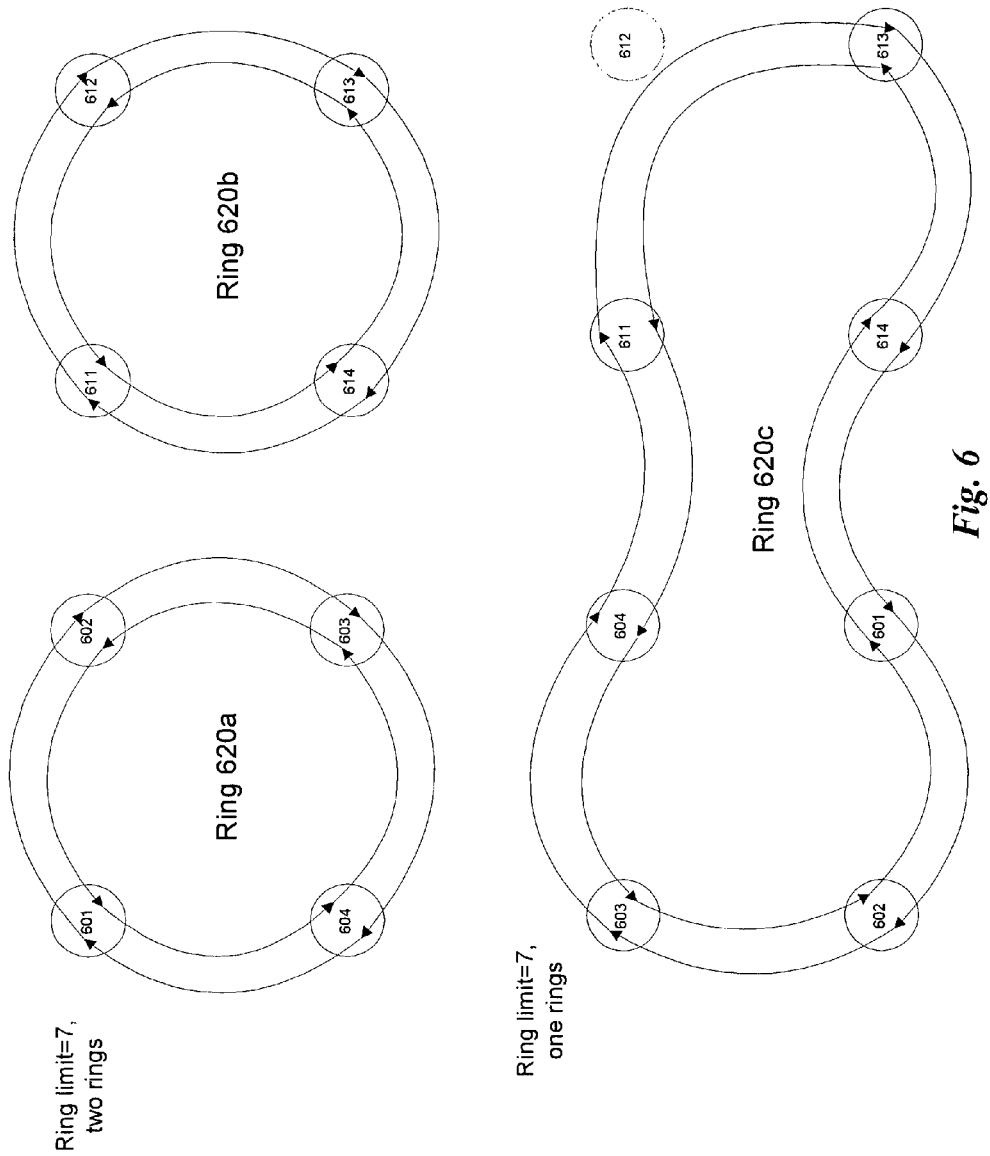
FIG. 6 illustrates a process of ring's joining in an embodiment of the present invention.

FIG. 6 illustrates a process of joining rings. In contrast to the potential problem of rings getting too big, if the number of end-user devices in different rings becomes too small and the length of such rings, accordingly, becoming too short, they will join themselves together to form a new, larger ring. FIG. 6 is describes such a process.

Presumably there are initially two rings in the network: 620a and 620b, each with four members. After a certain time, node 612 becomes unavailable (switched off). Ring 620b recognizes during a token turn-around that the node 612 is out of order or simply unavailable. The sum of all nodes in the two rings becomes equal to a Ring Limit parameter which is set to 7 for this example, e.g. the two existing rings can now be joined.

Rings join in such a way that in a new, joined ring the numbers of nodes order will be preserved, from a smallest to largest, e.g. 601, 602, 603, 604, 611, 613, and 614. Thus first and last nodes, (601 and 604 from the ring 620a and nodes 611 and 614 from the ring 620b), modify their pointers in such a way that the two rings will join together. As a result a new ring is created with all working nodes included, and number of nodes and order is preserved.

Figure 7:
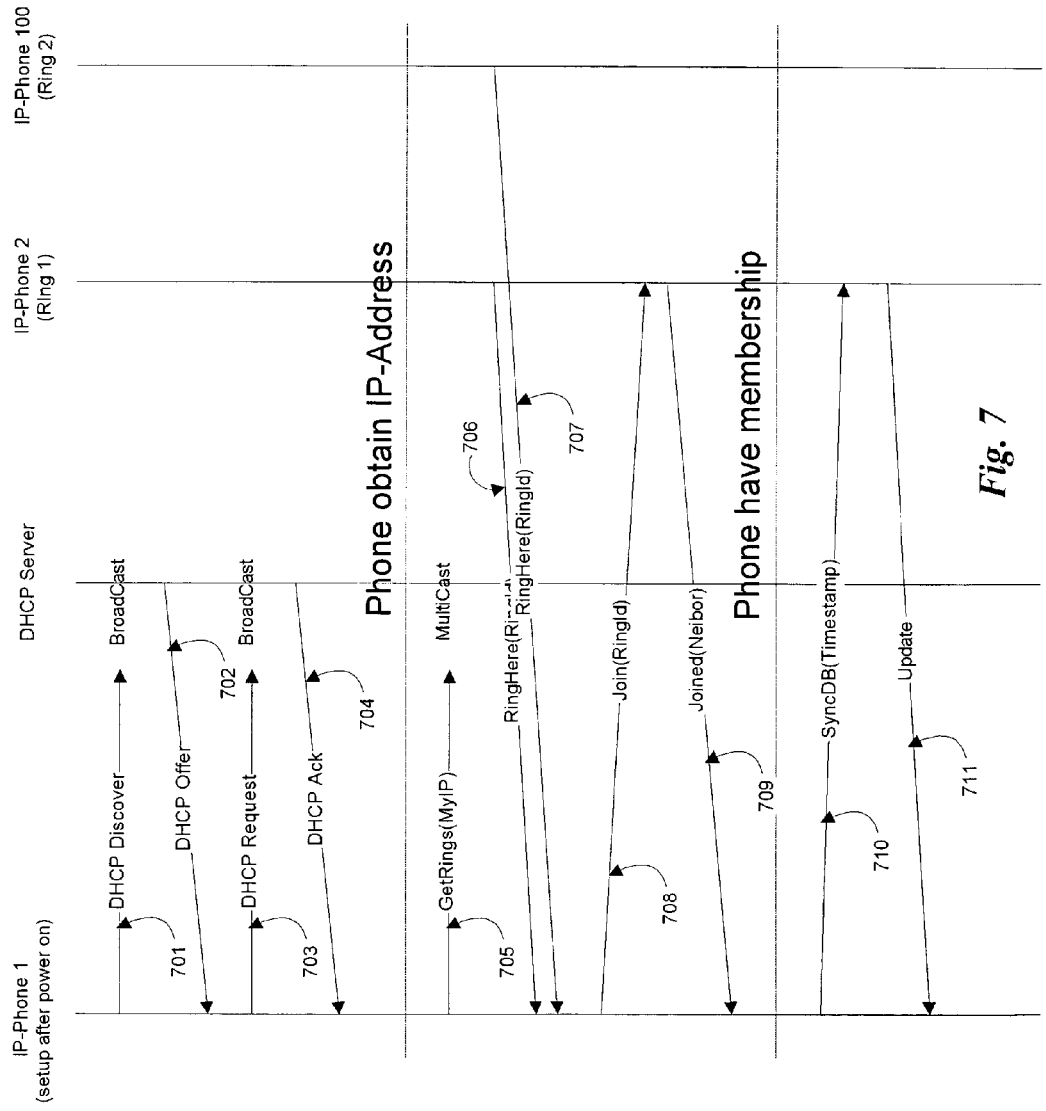
FIG. 7 illustrates a node (phone) starting up, joining the ring and getting the latest database update in an embodiment of the invention.

FIG. 7 is a diagram describing a node (IP Phone) start up, joining a ring, and getting the latest DB update. In this diagram node IP-Phone 1 sends a broadcast message (leg 701) in the network 201 to query for an IP Address. The DHCP-server 204 (see FIG. 2) answers (offer leg 702), and as a result Phone 1 requests the address (leg 703). The IP Address is provided to Phone 1 (acknowledge leg 704). In the first part of the diagram the request for IP-address is described using DHCP protocol for illustrative purposes only. Other methods such as static IP address may be used as well.

Node (202a) is trying to find any ring (at least one) existing in the network. Its sending multicast request (leg 705) in its sub network (211a). Few nodes including the 202b are responding to request from Node 202a (legs 706, 707). Node 202a choosing one of the rings and request (leg 708) a permission to participate from Node 202b. Node 202b sends a token across the ring with request and then provides (leg 709) Node 202a with information necessary for ring membership. In details that process described in FIGS. 3 and 4. After the insertion into the ring, Node 202a synchronize its data base with the current version by requesting it (leg 710) from Node 202b. Node 202b sends (leg 711) current database to Node 202a.

A user of an IP-Telephone at node 202a (FIG. 2) conducts a Login operation on Node 202a. In order to complete the Login process it is necessary to receive the User Profile, which operation is described below with reference to FIG. 8. The user inserts UserId using an IP-telephone key pad or any other input method for such an insertion.

Figure 8:
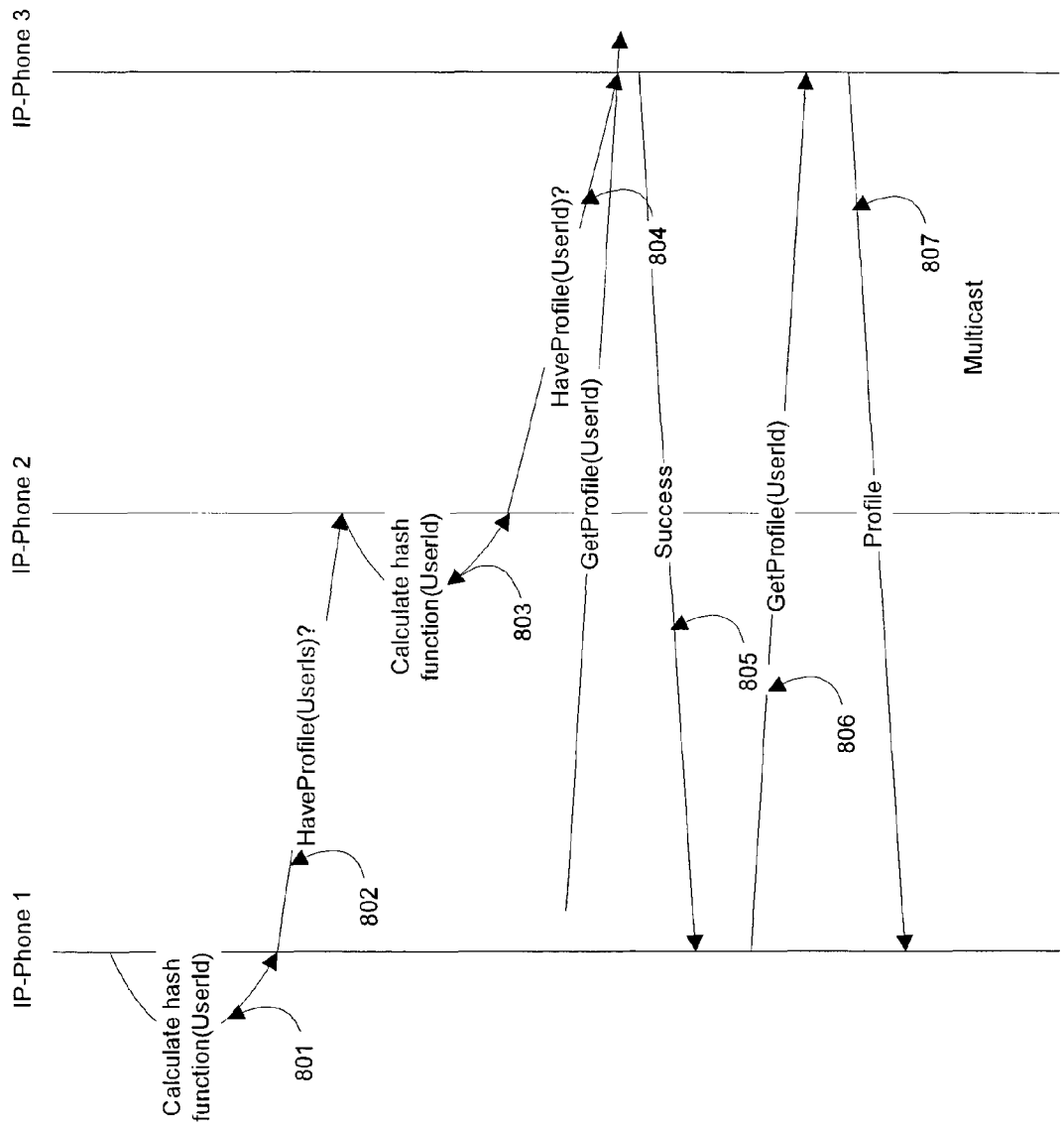
FIG. 8 illustrates a GetProfile (UserId) block in an embodiment of the invention.

FIG. 8 illustrates a GetProfile (UserId) process, which is a function of finding and retrieving a profile scenario, using, for example, a hash-function. The node requesting the profile calculates the hash-function from the node's ID as described relative to FIG. 13 below. It is emphasized here that the use of a hash function is exemplary, not limiting, and there are a number of other ways this step may be accomplished.

In FIG. 8 Node IP Phone1 is trying to connect to EP Phone2, the address of which was calculated using a hash function as is described in more detail below, relative to FIG. 13 (801). In the process IP Phone 1 sets up a timer. Leg 802 is a request to IP Phone 2 for UserId. IP Phone 2 is not available, so, at the end of the time set on the timer (illustrated by distance on the vertical axis of the diagram), that is, at the time of the end of leg 802, IP-Phone 2 calculates a new hash function shown by leg 803, and then queries IP-Phone 3 for UserId. This query is successful, and IP Phone 3 answers in the affirmative (leg 805), after which Phone 1 asks for the profile (leg 806), and Phone 3 returns the profile to Phone 1 (leg 807).

After receiving the Profile, Node 202a asks the user to insert the password. The user inserts the password, and Node 202a attempts to decrypt the private part of the profile (the user private key encrypted with at least his symmetrical key). If the decryption is successful the user is registered on Node 202a. After the successful login a message "UserLoggedOn" is created and sent using reliable multicast protocol. That message at least includes User Name, Id of a node where the user is logged in, and timestamp. All the nodes that receive the message will update their database.

Figure 9:
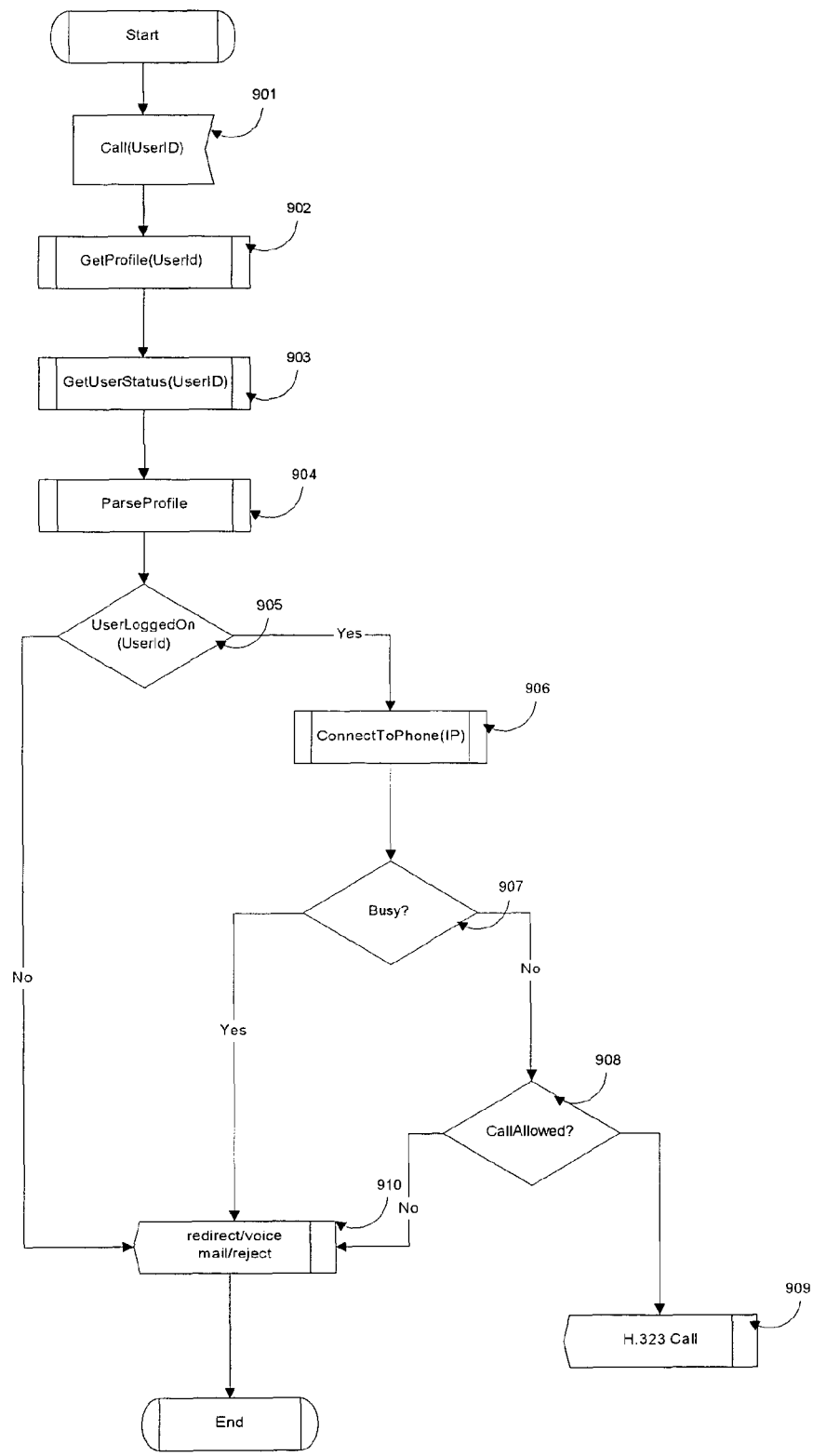
FIG. 9 illustrates a SDL diagram (flow chart) for a basic call in an embodiment of the invention.

FIG. 9 is a process flow diagram describing one of a number of possible basic call scenarios. In this example a user of node 1 is attempting to call a User at node 2. At step 901 the User ID is entered at node 1. At step 902 node 1 requests the profile, is answered in the affirmative, and receives the profile, as described with reference to FIG. 8 above. Node 1 then checks in its database at step 903 for UserId, Id information where the UserId belongs to User2. Such a table may look like this: {user name, Id of the node where user is logged on, flags.

Now at step 904 node 1 parses the profile of User2. If in the table the user is marked as registered (check on step 905), Node 202a in step 906 attempts to connect to the Node where User2 is registered. At step 906 a determination is made as to whether the phone at node 2 is in use. If not busy, at step 908 a determination is made as to whether the call is allowed. If so, at step 909 node 1 creates a voice session, using for example H.323, SIP or another appropriate protocol.

If at step 907 it is determined that node 2 is busy, then a determination is made at step 910 that either redirects the call, connects to a voice mail, or rejects the call. This determination is made by analyzing the profile for user 2, which in this example has the standard response for a busy determination.

Returning now to step 905, if in that step it is determined that User 2 is not logged on, then control goes directly to step 910 to redirect the attempted call.

Figure 10:
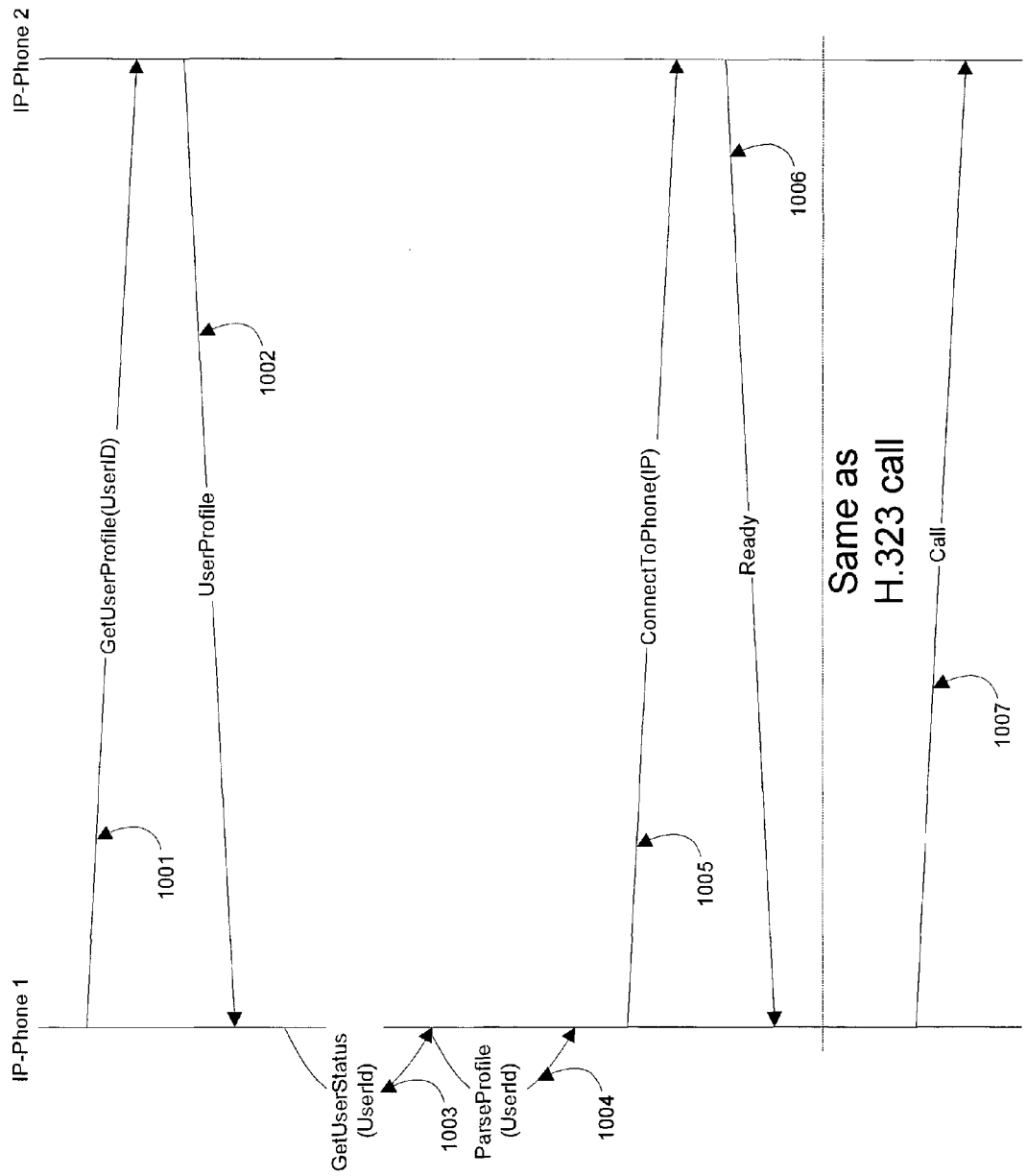
FIG. 10 illustrates a basic call scenario time diagram in an embodiment of the invention.

FIG. 10 illustrates a portion of the flow steps of FIG. 9, but in time diagram form rather than as a flow chart. User1 at node 1 is trying to call User2, as described above with reference to FIG. 9. User1 enters the User2 ID to place the call, after which node 1 requests the profile for User 2. Node 1 requests the profile as leg 1001. Node 2 returns the profile (leg 1002) to IP Phone 1. Node IP Phone 1 checks in the table the User 2 status (leg 1003) and reads (parses) the profile (leg 1004). IP Phone 1 connects to IP Phone 2 and checks user 2 availability (leg 1005). Node 2 answers with a message that it is available (leg 1006). Then IP Phone 1 creates a connection using H.323, SIP or other standard protocol. Leg 1007 illustrates the actual call.

Figure 11:
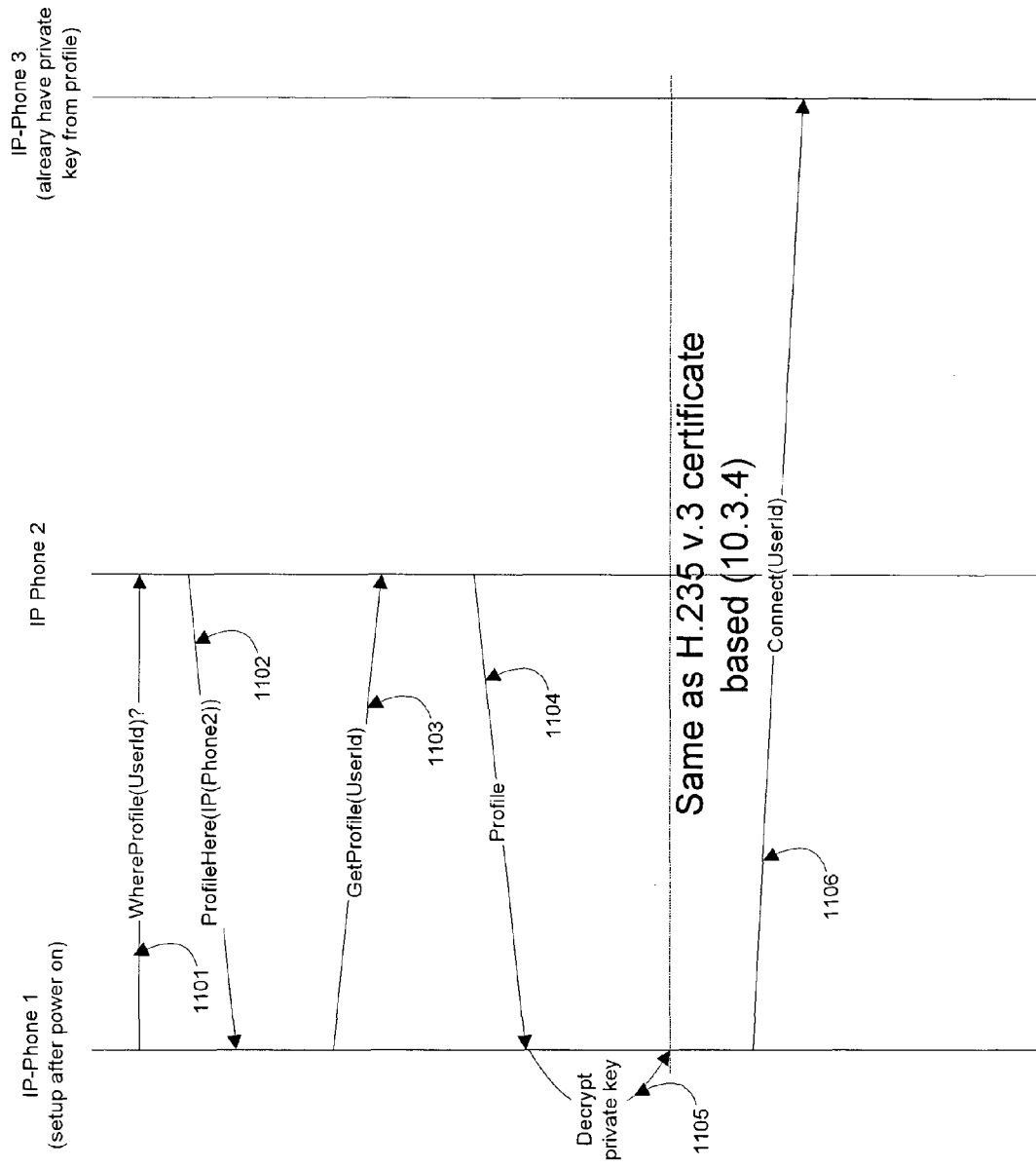
FIG. 11 illustrates security for a basic call scenario in an embodiment of the invention.

FIG. 11 illustrates a security implementation for a Basic call scenario. In this example IP-Phone 1 is already on and has received its IP address (not shown). The user responds to a Login request from the node by entering his unique ID and Password. Now IP-Phone 1 requests the address where the user profile is stored (leg 1101) using, for example, a hash function which is described below. At the end of leg 1101 one of the Phones (IP-Phone 2) on the network with the user profile receives the request. Phone 2 replies on the network that it has the user profile requested (leg 1102), and Phone-1 receives that reply. Now Phone 1 asks for the profile from Phone 2 (leg 1103), providing also the Phone 1 UserId, and Phone-2 provides the profile (leg 1104).

IP Phone-1 now attempts to decrypt its private key (1105) which is a part of the profile. If the operation proves successful it is assured it has received its own profile. If the operation fails then two variants are possible:
1. It received somebody else's profile and a possible intruder is in the network
2. The wrong password was used After successfully receiving its private key, IP Phone-1 can perform a call (1106).

On the level of voice call processing standard algorithms can be used. In some preferred embodiments H.323 connection is established so the security will be supported according to H.235 protocol of H.323. In preferred embodiments of the invention keys from profiles are used to identify all parties.

Figure 12:
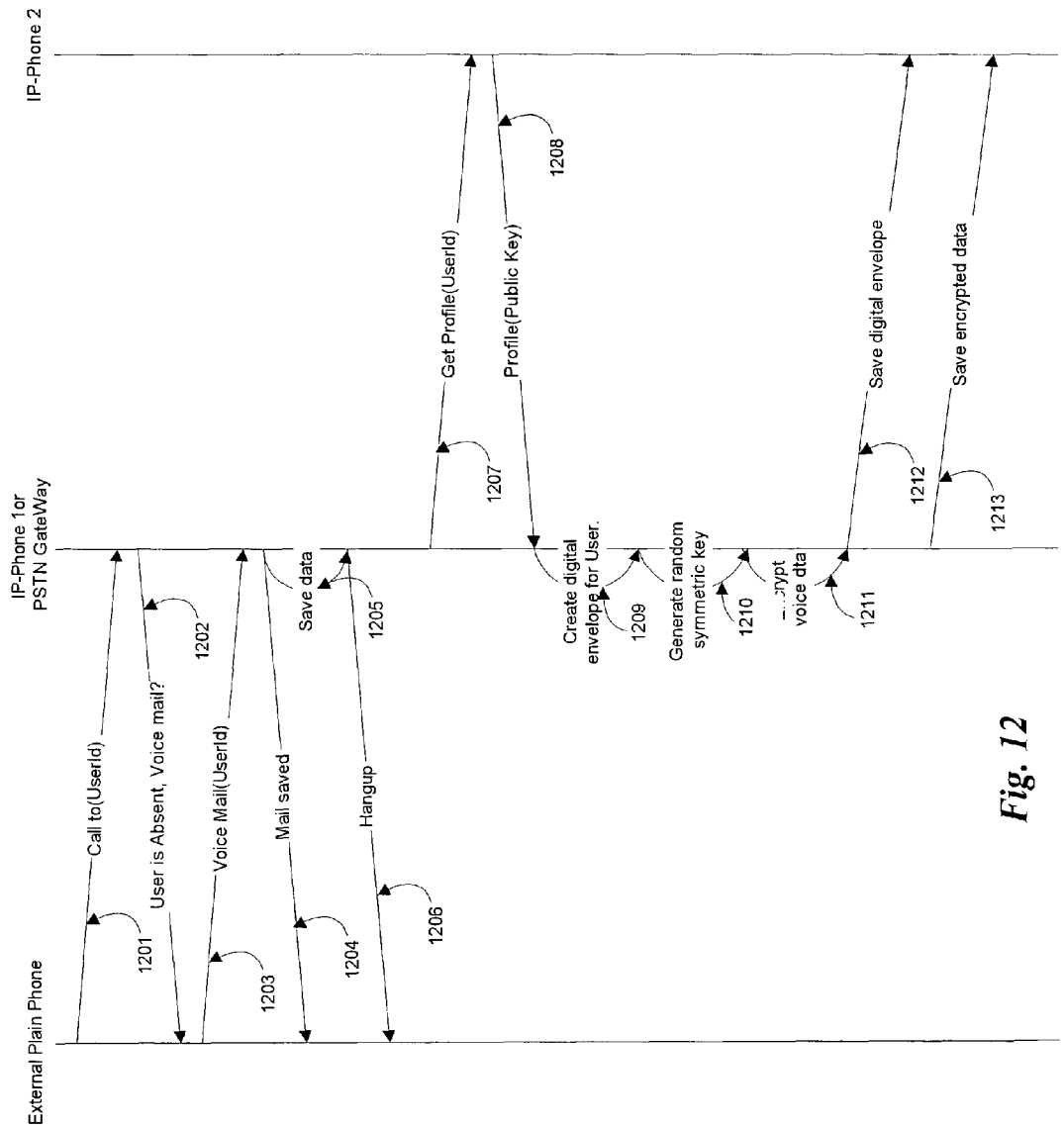
FIG. 12 illustrates voice mail feature access from a PSTN in an embodiment of the invention.

FIG. 12 illustrates a Voice Mail feature access from a PSTN in an embodiment of the invention. In this example an external POTs phone calls User 1 in the unique network of the invention. (leg 1201). The PSTN-gateway (205 FIG. 2) knows that User 1 is not logged in, and notifies the external node (leg 1202) that it is possible to leave a Voice Mail. The user of the external POTs phone records a message which is received (leg 1203) by the PSTN Gateway, which notifies (leg 1204) the external phone that the message was successfully recorded. The PSTN Gateway transfers the message into flash memory (leg 1205) and disconnects (leg 1206). The PSTN Gateway now requests (leg 1207) a profile of User 1 from IP Phone 2. Node EP Phone 2 returns (leg 1208) the requested profile to the PSTN Gateway, which extracts User1's Public Key and creates (leg 1209) a digital envelop for Voice Mail. Then Gateway then generates (leg 1210) a random symmetrical key with which it encrypts (leg 1211) the VM. Then the PSTN saves the digital envelop (leg 1212) and the data in it (leg 1213) on one of the nodes which are enabled to store VMs, such as IP Phone 2.

Figure 16:
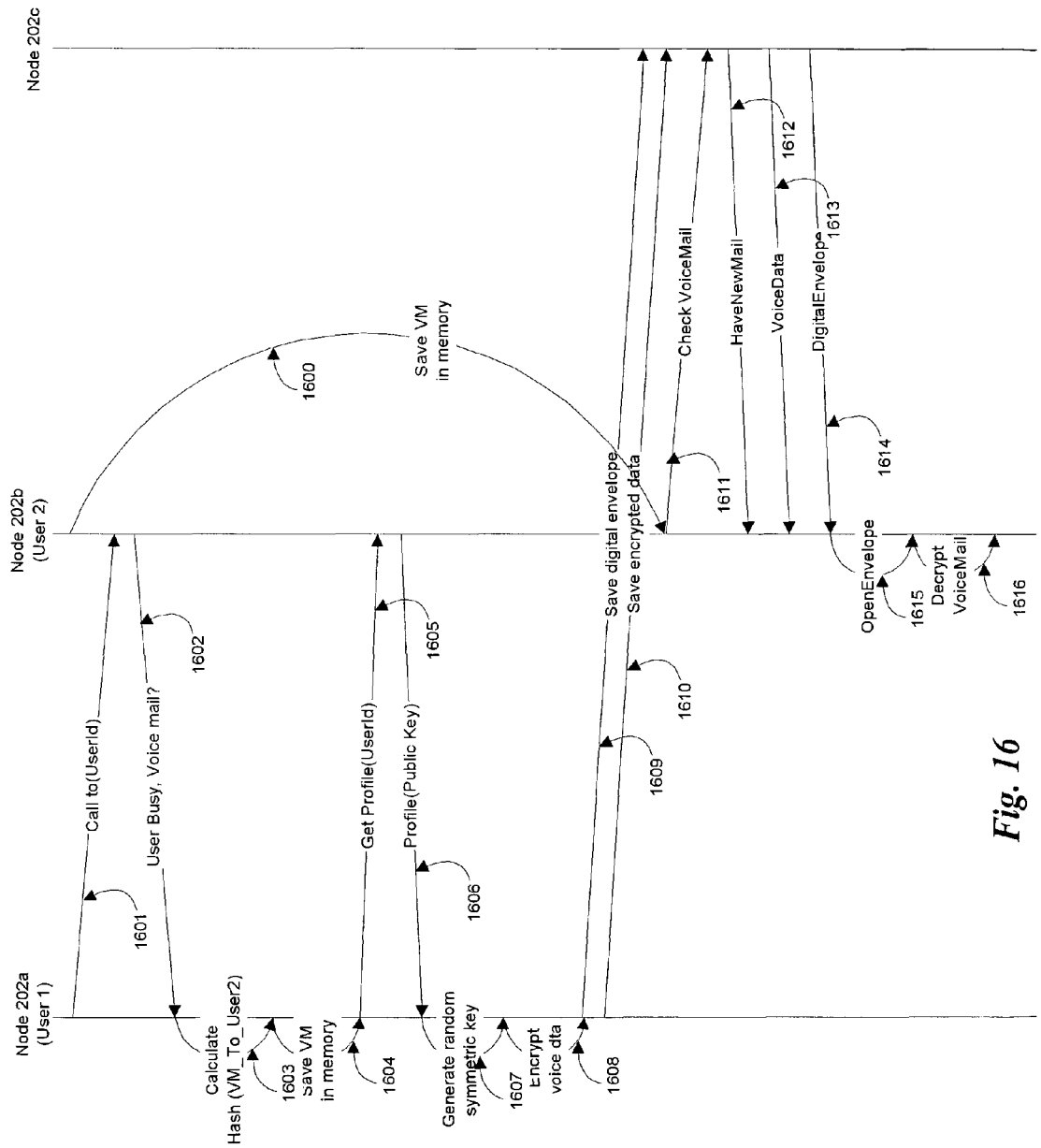
FIG. 16 illustrates voice mail feature access from a IP-phone in an embodiment of the invention.

FIG. 16 further illustrates features of voice mail. In this example User 1 of the node 202a calls (leg 1601) to User 2. User 2 is already connected (leg 1600) with another party in the network, thus node 202b responds to node 202a with a busy signal (leg 1602). Node 202a now needs to choose a node that is capable of storing a Voice Mail (VM node) for the User2. This is done, for example, using the same hash-function which was used for storage of any object on the network using L-TSM-CVR. For example all Voice Mail Holder nodes for user2 may be designated VM_to_User2. Based on this name the hash-function calculates (leg 1603) the number (address) of nodes on which the voice mail message should be stored, which is 202c in this example.

Now the operation is nearly identical to the operation described above with reference to FIG. 10. Node 202a stores (leg 1604) the data (Voice Mail message of User1 to User2) in its own IP Phone (Node 202a) memory. Then it requests (leg 1605) a profile of User2 from the Node 202b. Node 202a receives the profile (leg 1606) and gets public key of User from the profile provided. Then node 202a generates (Leg 1607) random symmetrical key and encrypts (leg 1608) the message with this key. Then using the Public Key of User2 node 202a creates the digital envelope and saves it with the random symmetrical key in it. Then node 202a saves the digital envelope (leg 1609) and the (1610) encoded voice mail message on node 202c.

Node 202b checks periodically (leg 1611) the Voice Mails for User2 (or it is notified if it was on line when the Voice Mail was received). The request for Voice Mail is sent across the virtual ring of Voice Mail holders. As soon as one of the nodes receives new Voice Mail it notifies (leg 1612) node 202b about new Voice Mail. Node 202b sends a request to node 202c and asks for the Voice Mail file. When node 202b receives from 202c a Voice Mail (leg 1613) as well as the digital envelop (leg 1614), it opens the envelop (leg 1615) and gets the symmetrical key, and decrypts (1616) the Voice Mail with the key. Now User2 has access to the Voice Mail file. After listening to Voice Mail the user can delete it or store it by a user request and in accordance with administrator settings.

Figure 13:
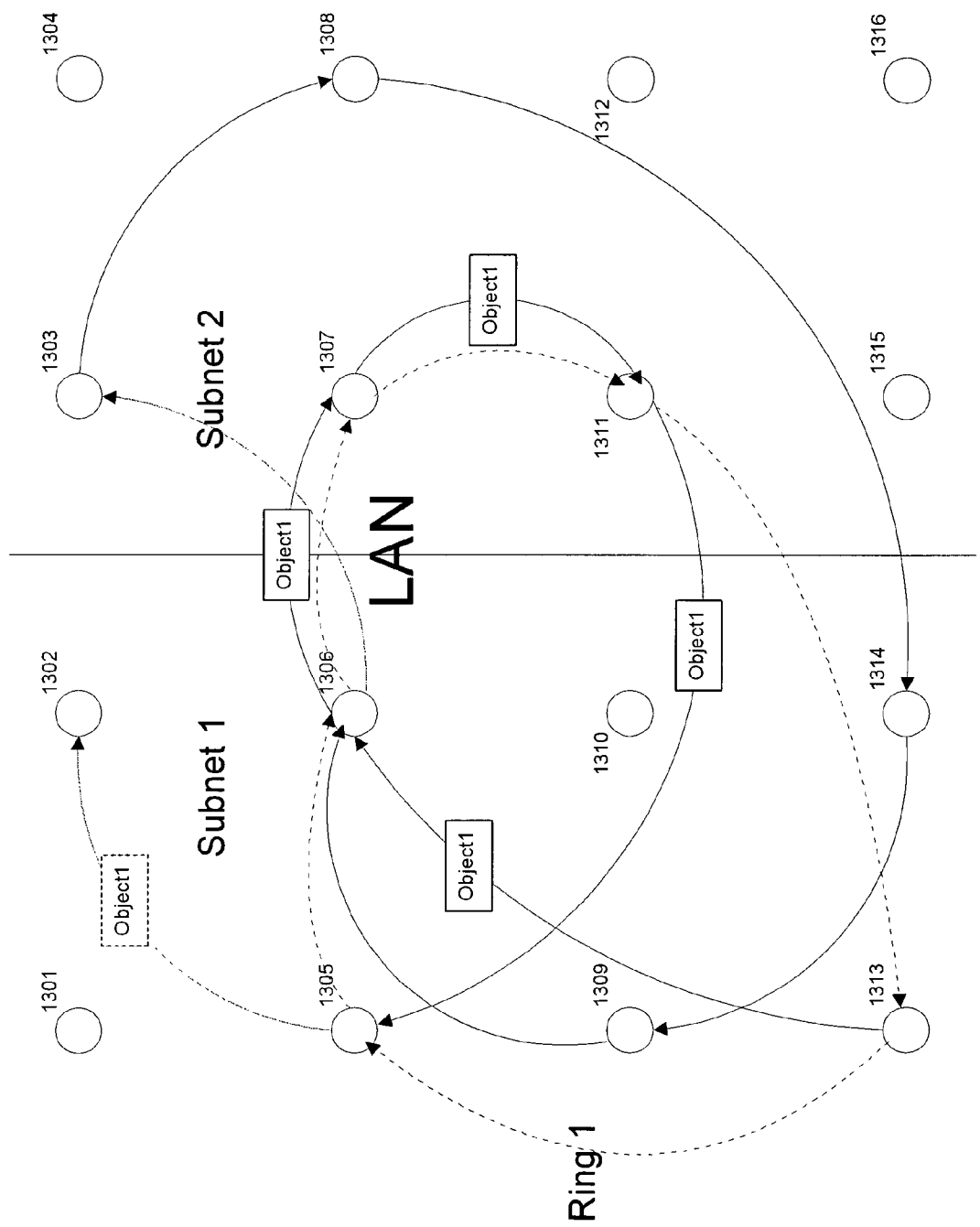
FIG. 13 illustrates a propagation of needed data across the network using hash function calculations in an embodiment of the invention.

FIG. 13 illustrates propagation of needed data across the network using hash function calculations in an embodiment of the invention. In this example nodes 1313 and 1303 need to store certain objects (data). Arrows on the figure connect nodes on which a hash function is proposing to replicate such data. In the example two objects of data are stored. Node 1313 need to store data (Object1) in the network with a certain redundancy factor. It then calculates the hash function results based on Object1 Id and receives an identifier of a node (1306), where the Object1 should be stored. Node 1313 sends to node 1306 an Object1 and notifies it about a necessary redundancy factor. Node 1306 stores a copy of Object1, but since the necessary redundancy factor is not reached, it calculates the result of the hash function again and receives a next node identifier (1307), where the Object1 should be stored.

Now Node 1307 receives Object1, stores it, and since the redundancy factor is not yet reached, node 1307 repeats the already-described procedure and sends Object1 to node 1311. Node 1311 stores an Object1 and repeats the procedure again. Node 1305 receives an Object1 from 1311 and verifies a number of copies with a necessary redundancy factor. This time no more copies are required. Object1 is now stored in the network with a necessary redundancy factor.

The dotted lines indicate a way towards a next node, which would be involved in order to preserve the necessary redundancy factor if a node (1305) was, for example, to become unavailable during the process. After Object1 is located on all of 4 nodes, assuming that the four nodes satisfy the redundancy requirement, they form a Logical Ring (L-TSM-CVR). The stroked-dotted line on FIG. 13 indicates a virtual ring. In the same manner, a hash function works for an Object2 stored by a node 1303, and the solid lines indicate the sequential process.

Here is an example of a hash function, which is used in preferred embodiment for calculation of addresses of nodes on which specific Objects can be stored and from which the specific objects can be obtained:

Let "i" be a number of a node, $1 <= i <= n$. Denote as $x(i)$ identifier of a node "i", which should belong to interval $[0; 1)$. Node's identifiers—is a set of numbers uniformly distributed over whole number axis.

With every node a segment of the number axis is identified $s(i)=[x(i), y(i)]$. Those segments have the following characteristics: beginning of a segment, point $x(i)$—is an identifier of node i. End point of a segment $y(i)$ is chosen in a way that a length of a segment would be equal to approximately $\log(2, n)/n$. Every time, when a node is joining the network or leaving it, a re-evaluation of a result for $\log(2, n)/n$ is performed and new value is set for $y(i)$. In other words the length of segments associated with the Nodes changes during system work.

Define "distance-halving rule":

For any given point on number axis "x", which belongs to the interval $[0; 1)$, we define two functions: $l(x)=x/2$ и $r(x)=x/2+1/2$. Accordingly for the segment $s(i)$ we can create two of its images applying functions "l" and "r" to all points of said segment. If segments $s(i)$ and $s(j)$ intersect, node i must know an address of node j and vise versa. It is possible to prove that if the criteria from previous paragraphs is fulfiled, a number of links that a node has to have=O(log(2, n)). E.g. every node has to know a logarithmic number of an IP-addresses of other nodes. The nodes segments of which are intersects or which are connected to each other in accordance with "distance-halving rule" are called neighbors.

Every resource has its own identifier r(i), where 1<=i<=m. Resource identifiers—are numbers, which belongs to interval [0; 1), which are also uniformly distributed over the whole number axis. Resource i is put on ALL nodes, which segments consists point r(i). Those nodes could be found simply by performing a lookup operation as described below.

In order to include a node into the network:

It is necessary to choose x(i). To choose the node's identifier the following method can be used. Calculate estimation q(i)= log(2, n)/n. To calculate this, end of segment is calculated for a node: y(i)=x(i)+q(i) mod 1. A node sends a notification to all its new neighbors (nodes, segments of which are intersected with its own or connected by "distance-halving rule") that it is on the network. The new node takes from its neighbours all the resources identifiers which belongs to the segment of the new node. Those neighbors can detect a fact of estimation change log(2, n)/n and upgrade value y(i). Some of the resources will then be outside of the segments of those nodes and may be discarded in order to avoid excessive redundancy. The information will not be lost since the resources were replicated on other nodes in the network.

If a node is leaving the network it will notify its neighbours and they may change an estimation for log(2, n)/n and their y(i). In this case the nodes' segments will expand, which may lead to change in contiguity and thus to relocation of certain resources to these nodes.

Search of a resource "r":

Let z(i)=x(i)+y(i)/2 and "w" is binary representation of z(i) as a bit string.

Define "distance-halving function" w(t, r) in following manner:

w(0,r)=r w(t||0,r)=l(w(t,r))

w(t||1,r)=r(w(t,r))

It is necessary to find a minimal "t", so w(t, r) will belong to segment s(i) of a current node "i".

All of the nodes which will be addressed in accordance to the rules of creation of the "distance-halfing function" w(t, r) will know the addresses of each other and will contain a lookup path from the current node "i" to the node content resource "r".

Figure 14:
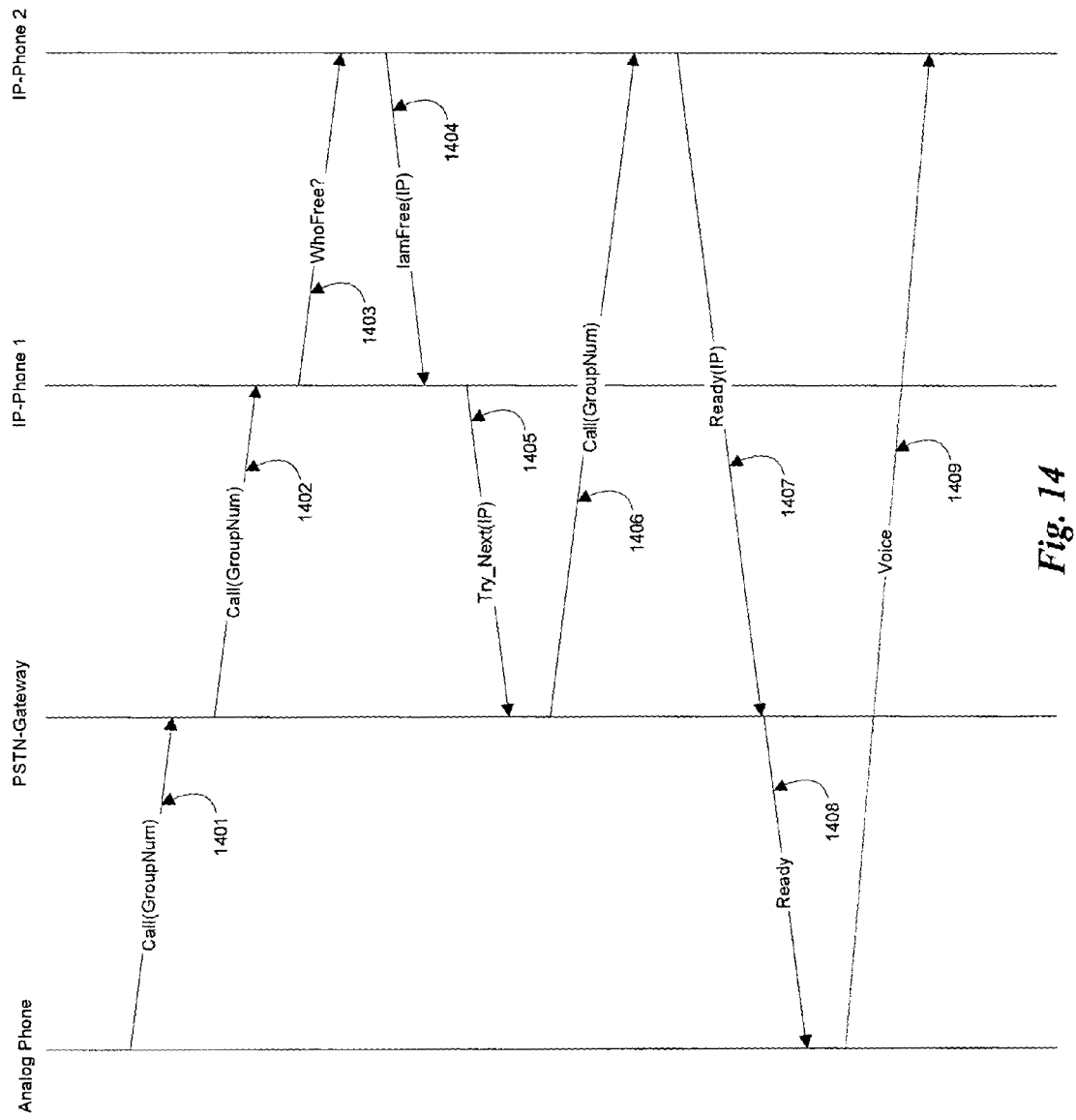
FIG. 14 illustrates a call center implementation scenario in an embodiment of the invention.

FIG. 14 illustrates a call center implementation in an embodiment of the present invention. In FIG. 14 outside User1 at Analog Phone dials a number of a Call-Center using a PSTN-Gateway (1401). The call comprises a group number. The PSTN-gateway receives the call, and requests availability (1402) of IP-Phone1, which is serving that group number. Node IP-Phone1 is busy, and IP-Phone 1 redirects (1403) the request to the next node in the group, which is (IP-Phone2). Node IP-Phone2 is available to receive the call, and notifies (1404) IP-Phone1 about its availability. IP-Phone1 notifies (1405) PSTN-gateway about an availability of IP-Phone2. The PSTN-gateway requests (1406) IP-Phone2 to receive the call with User1. Now IP-Phone 2 acknowledges (1407) the availability. Finally PSTN-Gateway signals (1408) the Analog Phone for a start of conversation, and the Analog Phone starts (1409) a voice session with IP-Phone2 using the PSTN-gateway.

Figure 15:
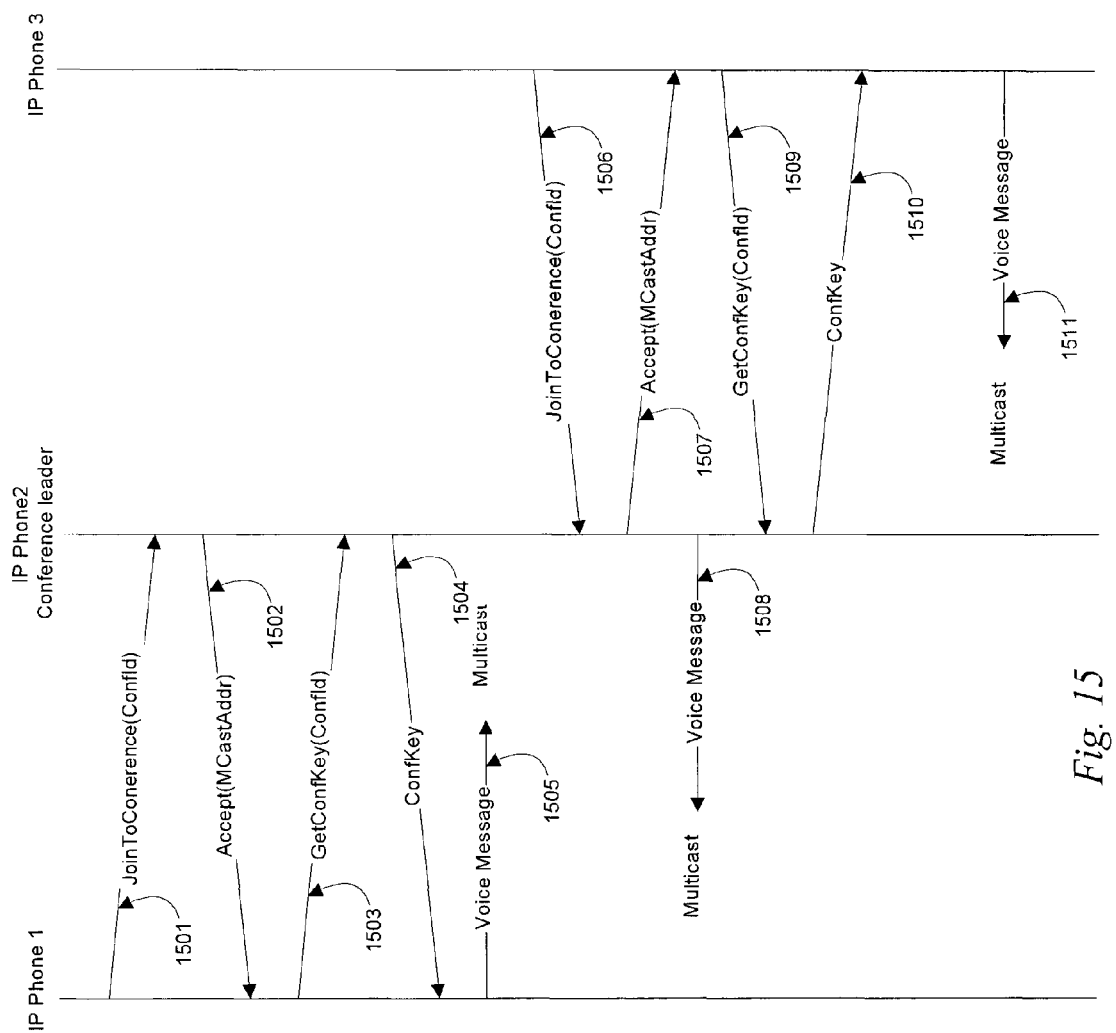
FIG. 15 illustrates a conference call scenario in an embodiment of the invention.

FIG. 15 illustrates a conference call situation. Node IP Phone1 would like to join the Conference Call and sends a join request (1501) to IP-Phone2, which is the conference leader. The conference leader receives the request, and answers (1502) to IP-Phone1 with an address of a Multicast-group, in which the Conference is taking place. IP-Phone2 sends a request (1503) to receive the session key to decrypt the voice data on the conference call. IP Phone-2 notifies (1504) IP Phone 1 about the session key. IP-Phone1 (1505) joins the Conference.

Now another node (IP-Phone3) also wants to join the conference and sends (1506) IP-Phone2 a request to participate. IP-Phone2 (conference leader) receives the request, and answers (1507) to IP-Phone3 with an address of the Multicast-group, in which the Conference is taking place. In parallel, Conference Leader (IP-Phone2) sends (1508) voice data. IP-Phone2 sends a request (1509) to receive the session key to decrypt the voice data. Now IP-Phone2 notifies (1510) IP-Phone 1 of the session key. IP-Phone3 (1511) now joins the Conference.

While the foregoing invention has been described in terms of the various embodiments described in enabling detail above, numerous variations are clearly possible and probable. Accordingly, many modifications and changes to embodiments described above are considered to be within the spirit and scope of the disclosure, not limited thereto, and the invention is limited only by the scope of the following claims.

What is claimed is:

1. A system, comprising:
two or more Internet Protocol (IP) telephony units configured to be interfaced to a network; and
instances of IP-Telephony software stored on the two or more IP telephony units,
wherein the two or more IP telephony units, through execution of the instances of the IP-telephony software, in absence of any switches and servers in the network, automatically cooperate to form one or more organizational groups in the network and provide one or more telephony functions to the two or more IP telephony units, and
wherein the two or more IP telephony units form one or more virtual rings, as the one or more organizational groups, and deform at least one of the one or more virtual rings, and wherein at least one virtual ring of the one or more virtual rings is configured for use on an application layer that implements a Transmission Control Protocol (TCP) or a User Datagram Protocol (UDP) over an Internet Protocol (IP), and at least one token associated with the at least one virtual ring is configured to facilitate at least one of reliable packet delivery, data flow control, data redundancy, or support for supplementary services.

2. The system of claim 1 wherein individual ones of the instances of the IP-telephony software also provide for communication of text, image data, voice data, or a combination thereof, between individual ones of the telephony units.

3. The system of claim 1 wherein the one or more virtual rings formed are two sided, multi-connected virtual rings.

4. The system of claim 1 wherein the two or more IP telephony units are configured to provide one or more control functions, wherein responsive to activation, an individual IP telephony unit connected to the network is registered as a member of a virtual ring in the network, and responsive to deactivation, membership in the virtual ring is withdrawn.

5. The system of claim 1 wherein an IP telephony unit of the two or more IP telephony units comprises a mass storage, and the cooperation of the two or more IP telephony units treats the mass storage at the IP telephony unit of the two or more IP telephony units as shared memory.

6. The system of claim 5 wherein the shared memory provides for voice mail services at the IP telephony unit or another IP telephony unit of the two or more IP telephony units.

7. The system of claim 6 wherein the shared memory is configured to enable inter-unit transfer of data files other than voice files from the other IP telephony unit to the IP telephony unit and storage of the data files other than voice files in the shared memory.

8. The system of claim 5 wherein power-independent flash memory is used for all or part of the mass storage.

9. The system of claim 5 wherein redundancy storage and a data relocation scheme is implemented on multiple ones of the two or more IP telephony units.

10. The system of claim 9 wherein stored data is prioritized, and higher priority data is stored in a higher number of storage locations than a number of storage locations used to store data of lower priority than the higher priority data.

11. The system of claim 9 wherein the redundancy storage is based at least in part on a determined redundancy factor parameter.

12. The system of claim 11 wherein data, which is to be redundantly stored, is stored at one or more of the two or more IP telephony units iteratively until the value of the redundancy factor parameter is traversed.

13. The system of claim 11 wherein the data is stored at fewer ones of the two or more IP telephony units iteratively until the value of the redundancy factor parameter is traversed.

14. The system of claim 1 wherein the network is one of a local area network (LAN), a wide area network (WAN), an IP-based network, or a combination thereof.

15. The system of claim 1 wherein multicast technology is incorporated for at least data and software updating of nodes in virtual rings.

16. The system of claim 1 wherein one or more of the two or more IP telephony units are enabled as one or more administrator stations and utilize one or more administration functions to configure the system.

17. The system of claim 1 wherein the IP-Telephony software comprises one or more hash functions.

18. The system of claim 17 wherein at least one IP telephony unit of the two or more IP telephony units is at least one node in a serverless network, and the one or more hash functions are used to determine, assign and manage addresses for the at least one node.

19. The system of claim 17 wherein the at least one node on the network stores data for at least one other node on the network, and the one or more hash functions are used in determining node identity for storage.

20. The system of claim 1 wherein the one or more organizational groups includes a group of participating IP-telephony units that is split into one or more smaller organizational groups based at least in part on a determined metric transitioning a predetermined parameter value.

21. The system of claim 20 wherein the predetermined parameter value is a number of IP-telephony units, a time of token turnover, a ring length, or combination thereof.

22. The system of claim 1 wherein the one or more organizational groups comprises two or more organizational groups of participating IP-telephony units that are joined into one or more larger organizational groups based at least in part on a determined metric transitioning a predetermined parameter value.

23. The system of claim 22 wherein the predetermined parameter value is a number of IP-telephony units, a time of token turnover, a ring length, or combination thereof.

24. The system of claim 1 wherein the network comprises at least a portion of a wireless communications network.

25. The system of claim 24 wherein one or more of the two or more IP telephony units comprises a mobile telephony component facilitating access to the at least a portion of the wireless communications network.

26. A device, comprising:
a port for connecting to a network; and
an instance of an Internet Protocol (IP)-telephony software for an IP-telephony unit,
wherein the IP-telephony unit, by virtue of execution of the instance of the IP-telephony software, is enabled to, in absence of any switches and servers in the network, automatically cooperate with at least one other IP-telephony unit to form one or more organizational groups in the network in packet communication with the at least one other IP-telephony unit and provide one or more IP-telephony functions to the IP-telephony unit, and
wherein the IP-telephony unit, if interfaced to the network, is enabled to form one or more virtual rings as the one or more organizational groups, and deform a particular virtual ring of the one or more virtual rings, and wherein at least one virtual ring of the one or more virtual rings is configured to use an application layer that uses a Transmission Control Protocol (TCP) or a User Datagram Protocol (UDP) over an IP-based network, and at least one token associated with the at least one virtual ring is used for at least one of reliable packet delivery, data flow control, data redundancy, or support for supplementary services.

27. The device of claim 26 wherein the instance of the IP-telephony software provides for communication of text, image data, voice data, or a combination thereof, on the network.

28. The device of claim 26 wherein the one or more virtual rings formed are two-sided, multi-connected virtual rings.

29. The device of claim 26 wherein the IP-telephony unit is configured to provide one or more control functions, wherein responsive to activation, the IP-telephony unit connected to the network is registered as a member of a virtual ring of the one or more virtual rings in the network, and responsive to deactivation, membership in the virtual ring is withdrawn.

30. The device of claim 26 wherein the IP-telephony unit comprises a mass storage, and in cooperation on the network the mass storage is treated as shared memory.

31. The device of claim 30 wherein the shared memory provides for voice mail services for the IP-telephony unit.

32. The device of claim 30 wherein the shared memory is configured to enable inter-unit transfer of data files other than voice files from another IP-telephony unit to the IP-telephony unit and storage of the data files other than voice files in the shared memory.

33. The device of claim 30 wherein power-independent flash memory is used for all or part of the mass storage.

34. The device of claim 30 wherein redundancy storage and a data relocation scheme is implemented to provide fault tolerance.

35. The device of claim 34 wherein stored data is prioritized, and higher priority data is sent out to be stored in a higher number of storage locations than a number of storage locations used to store lower priority data.

36. The device of claim 34 wherein the redundancy storage of data is based at least in part on a determined redundancy factor parameter.

37. The device of claim 36 wherein the data is stored at one or more of the at least one other IP-telephony unit iteratively until the value of the redundancy factor parameter is traversed.

38. The device of claim 36 wherein the data is stored at fewer ones of the other IP-telephony units iteratively until the value of the redundancy factor parameter is traversed.

39. The device of claim 26 wherein the network is one of a local area network (LAN), a wide area network (WAN), an IP-based network, or a combination thereof.

40. The device of claim 26 wherein multicast technology is incorporated for at least data and software updating of nodes in one or more virtual rings.

41. The device of claim 26 wherein the IP-telephony unit is enabled as an administrator station, having one or more administration functions to configure a system of IP-telephony units cooperating on a network.

42. The device of claim 26 wherein the instance of IP telephony software comprises one or more hash functions.

43. The device of claim 42 wherein the IP-telephony unit and the at least one other IP-telephony unit comprise nodes in a serverless network, and the one or more hash functions are used to determine, assign and manage addresses for the nodes in the network.

44. The device of claim 42 wherein one or more of the nodes on the network store data for one or more other nodes on the network, and the one or more hash functions are used in determining node identity for storage.

45. The device of claim 26 wherein the IP-telephony unit interfaced to the network is enabled to join separate organizational groups, split an organizational group, or a combination thereof, based at least in part on a determined metric transitioning a predetermined parameter value.

46. The system of claim 45 wherein the predetermined parameter value is a number of IP-telephony units, a time of token turnover, a ring length, or combination thereof.

47. A method, comprising:
interfacing, by two or more Internet Protocol (IP) telephony units, to a network;
executing instances of IP-Telephony software by the two or more IP telephony units;
automatically cooperating, by the two or more IP telephony units, to form one or more organizational groups in the network in absence of any switches and servers in the network;
forming one or more virtual rings as the one or more organizational groups;
using at least one virtual ring of the one or more virtual rings on an application layer that implements a Transmission Control Protocol (TCP) or a User Datagram Protocol (UDP) over an Internet Protocol (IP);
using at least one token, which is associated with the at least one virtual ring, for at least one of reliable packet delivery, data flow control, data redundancy, or support for supplementary services;
deforming at least one of the one or more virtual rings; and
providing one or more telephony functions by the two or more IP telephony units in absence of any switches and servers in the network.

48. The method of claim 47 wherein the providing the one or more telephony functions further comprises providing communication of text, image data, voice data, or a combination thereof, between an IP telephony unit and at least one other IP telephony unit of the two or more IP telephony units.

49. The method of claim 47 wherein the forming the one or more virtual rings further comprises forming one or more two sided, multi-connected virtual rings.

50. The method of claim 47 further comprising:
activating an IP telephony unit of the two or more IP telephony units;
registering the IP telephony unit as a member of a virtual ring of the one or more virtual rings in the network;
deactivating an other IP telephony unit of the two or more IP telephony units; and
withdrawing the other IP telephony unit as a member of the virtual ring.

51. The method of claim 47 further comprising:
providing a mass storage in an IP telephony unit of the two or more IP telephony units; and
using the mass storage as shared memory among the two or more IP telephony units.

52. The method of claim 51 further comprising:
providing voice mail services at least one of the two or more IP telephony units.

53. The method of claim 51 further comprising:
transferring a data file from another IP telephony unit to the IP telephony unit of the two or more IP telephony units; and
storing the data file.

54. The method of claim 51 further comprising:
relocating a piece of data from another IP telephony unit to the IP telephony unit of the two or more IP telephony units.

55. The method of claim 51 further comprising:
redundantly storing the piece of data on more than one IP telephony unit of the two or more IP telephony units.

56. The method of claim 55 further comprising:
prioritizing respective pieces of data; and
storing a piece of data of the respective pieces of data that has a higher priority than another piece of data of the respective pieces of data that has a lower priority.

57. The method of claim 55, the redundantly storing the piece of data, further comprising:
redundantly storing the piece of data based at least in part on a determined redundancy factor parameter.

58. The method of claim 57 further comprising:
redundantly storing the piece of data at one or more of the two or more IP telephony units iteratively until the value of the redundancy factor parameter is traversed.

59. The method of claim 57 further comprising:
storing the piece of data at fewer IP telephony units of the two or more IP telephony units iteratively until the value of the redundancy factor parameter is traversed.

60. The method of claim 47 further comprising:
interfacing the two or more IP telephony units to the network comprising at least one of a local area network (LAN), a wide area network (WAN), an IP-based network, or a combination thereof.

61. The method of claim 47 further comprising:
updating at least one node in the one or more virtual rings via multicast technology.

62. The method of claim 47 further comprising:
performing at least one administrative function by an IP telephony unit of the two or more IP telephony units serving as an administrator station.

63. The method of claim 47 further comprising:
hashing data by applying at least one hash function to the data.

64. The method of claim 63 further comprising:
utilizing the at least one hash function to determine, assign and manage addresses for nodes, wherein at least two of the two or more IP telephony units serve as the nodes in a serverless network.

65. The method of claim 63 further comprising:
storing data in one or more of the nodes on the network store data for one or more other nodes on the network; and
determining node identity for storage of the data using the at least one hash function.

66. The method of claim 47 further comprising:
at least one of:
joining the IP telephony unit of the two or more IP telephony units with at least one organizational group, or
separating the IP telephony unit from at least one organizational group, based at least in part on a determined metric transitioning a predetermined parameter value.

67. The method of claim 66 wherein the predetermined parameter value is a number of IP telephony units, a time of token turnover, a ring length, or combination thereof.

68. A tangible computer-readable medium having stored thereon, computer-executable instructions that, if executed by a computing device, cause the computing device to perform operations comprising:
instantiating an instance of an Internet Protocol (IP)-telephony application;
connecting to at least one packet-based communications network; and
automatically cooperating with at least one other instance of the IP-telephony application via the at least one packet-based communications network to form at least one cooperative group of instances of the IP-telephony application, in absence of any switches and servers in the at least one packet-based communications network, wherein the instance of the IP-telephony application and the at least one other instance of the IP-telephony application form one or more virtual rings, as the at least one cooperative group of instances of the IP-telephony application, and deform at least one of the one or more virtual rings, and wherein at least one virtual ring of the one or more virtual rings is configured for use on an application layer that implements a Transmission Control Protocol (TCP) or a User Datagram Protocol (UDP) over an Internet Protocol (IP), and at least one token associated with the at least one virtual ring is configured to facilitate at least one of reliable packet delivery, data flow control, data redundancy, or support for supplementary services.

69. The medium of claim 68, wherein the operations further comprise:
performing at least one IP telephony function, in absence of any switches and servers in the at least one packet-based communications network.

70. A computing device, comprising:
means for interfacing to at least one network; and
means for performing at least one Internet Protocol (IP) telephony function that, in absence of any switches and servers in the at least one network, automatically joins, using packet messaging, an IP telephony unit with at least one other IP telephony unit to form at least one organizational group in the at least one network and provides the at least one IP telephony function, wherein the IP telephony unit and the at least one other IP telephony unit form one or more virtual rings, as the at least one organizational group, and deform at least one of the one or more virtual rings, and wherein at least one virtual ring of the one or more virtual rings is configured for use on an application layer that implements a Transmission Control Protocol (TCP) or a User Datagram Protocol (UDP) over an Internet Protocol (IP), and at least one token associated with the at least one virtual ring is configured to facilitate at least one of reliable packet delivery, data flow control, data redundancy, or support for supplementary services.

\* \* \* \* \*

UNITED STATES PATENT AND TRADEMARK OFFICE
CERTIFICATE OF CORRECTION

PATENT NO. : 7,990,948 B2  
APPLICATION NO. : 10/641821  
DATED : August 2, 2011  
INVENTOR(S) : Goroshevsky et al.

Page 1 of 1

It is certified that error appears in the above-identified patent and that said Letters Patent is hereby corrected as shown below:

Title Page 2, item (56), under "Other Publications", in Column 1, Line 1, delete "CNOA" and insert -- CN OA --.

Title Page 2, item (56), under "Other Publications", in Column 2, Line 1, delete "JPOA" and insert -- JP OA --.

Column 19, line 34, in Claim 46, delete "system" and insert -- device --.

Column 20, line 17, in Claim 52, delete "services at" and insert -- services at at --.

Signed and Sealed this
Seventeenth Day of April, 2012

David J. Kappos
*Director of the United States Patent and Trademark Office*